(12) United States Patent
Cho et al.

(10) Patent No.: US 12,481,087 B2
(45) Date of Patent: *Nov. 25, 2025

(54) INFRARED SELECTIVE EMITTER WITH IMPROVED WEAR RESISTANCE

(71) Applicant: UIF (University Industry Foundation), Yonsei University, Seoul (KR)

(72) Inventors: Hyung Hee Cho, Seoul (KR); Nam Kyu Lee, Gyeonggi-do (KR); Joon-Soo Lim, Gyeongsangbuk-do (KR); In Joong Chang, Seoul (KR); Ju Yeong Nam, Seoul (KR)

(73) Assignee: UIF (University Industry Foundation), Yonsei University, Seoul (KR)

( * ) Notice: Subject to any disclaimer, the term of this patent is extended or adjusted under 35 U.S.C. 154(b) by 360 days.

This patent is subject to a terminal disclaimer.

(21) Appl. No.: 18/112,948

(22) Filed: Feb. 22, 2023

(65) Prior Publication Data

US 2023/0266508 A1    Aug. 24, 2023

(30) Foreign Application Priority Data

Feb. 22, 2022    (KR) .................. 10-2022-0022941

(51) Int. Cl.
*G02B 1/14* (2015.01)
*F41H 3/00* (2006.01)
*G02B 1/00* (2006.01)

(52) U.S. Cl.
CPC ............... *G02B 1/14* (2015.01); *G02B 1/002* (2013.01); *F41H 3/00* (2013.01)

(58) Field of Classification Search
CPC ........... G02F 1/39; G02B 1/002; G02B 5/281; G02B 1/14; F41H 3/02; F41H 3/00; H01Q 17/007
See application file for complete search history.

(56) References Cited

U.S. PATENT DOCUMENTS

2017/0219746 A1* 8/2017 Nagao ...................... C23F 1/02
2017/0338567 A1* 11/2017 Puscasu .................. G01J 5/024

OTHER PUBLICATIONS

Lee, Namkyu, et al., "Flexible Thermocamouflage Materials in Supersonic Flowfields with selective Energy Dissipation", Sep. 2, 2021, 9 pages. (Year: 2021).*
Cheng, Fei, et al., "Structural color printing based on plasmonic metasurfaces of perfect light absorption," Jun. 5, 2015, 10 pages.
Lee, Namkyu, et al., "Metamaterial-Selective Emitter for Maximizing Infrared Camouflage Performance with Energy Dissipation," 2019, 8 pages.

(Continued)

*Primary Examiner* — Jia X Pan
(74) *Attorney, Agent, or Firm* — Foley & Lardner LLP

(57) ABSTRACT

The present invention provides an infrared selective emitter that can selectively emit infrared energy in a desired wavelength band, can be easily applied to a curved surface due to its flexible properties, and can protect the formed surface structure of the infrared selective emitter from external stimuli such as friction, thereby improving wear resistance and maximizing the function of infrared selective emission.

9 Claims, 27 Drawing Sheets

(56) References Cited

OTHER PUBLICATIONS

Office Action issued by the Korean Intellectual Property Office (KIPO) for corresponding Korean Patent Application No. 10-2022-0022941, dated Apr. 6, 2023, 5 pages.
Zhan, Zhigang, et al., "Rapid design of broadband absorption metasurfaces for selective tailoring of infrared radiation characteristics," Jul. 29, 2021, 11 pages.

* cited by examiner

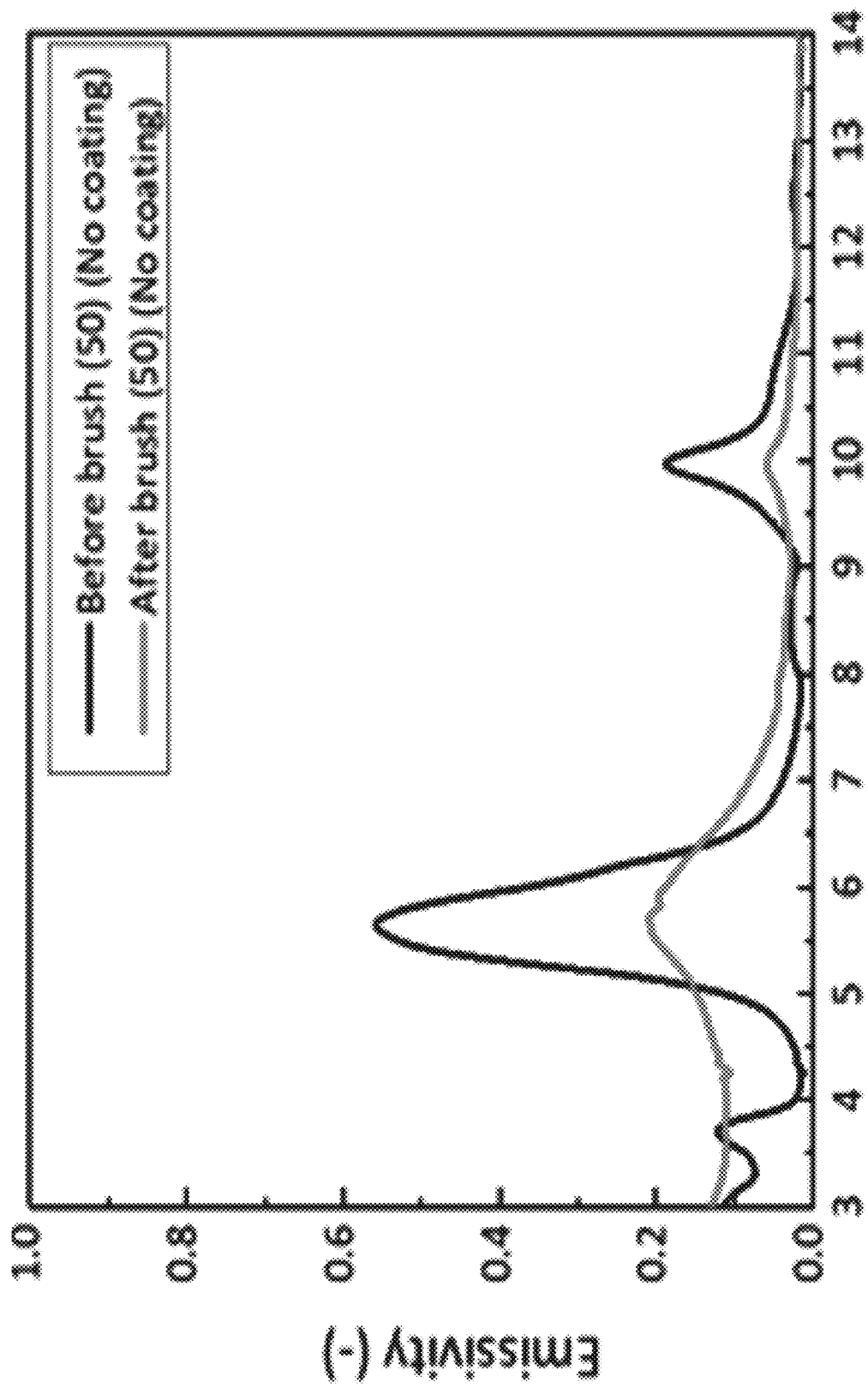

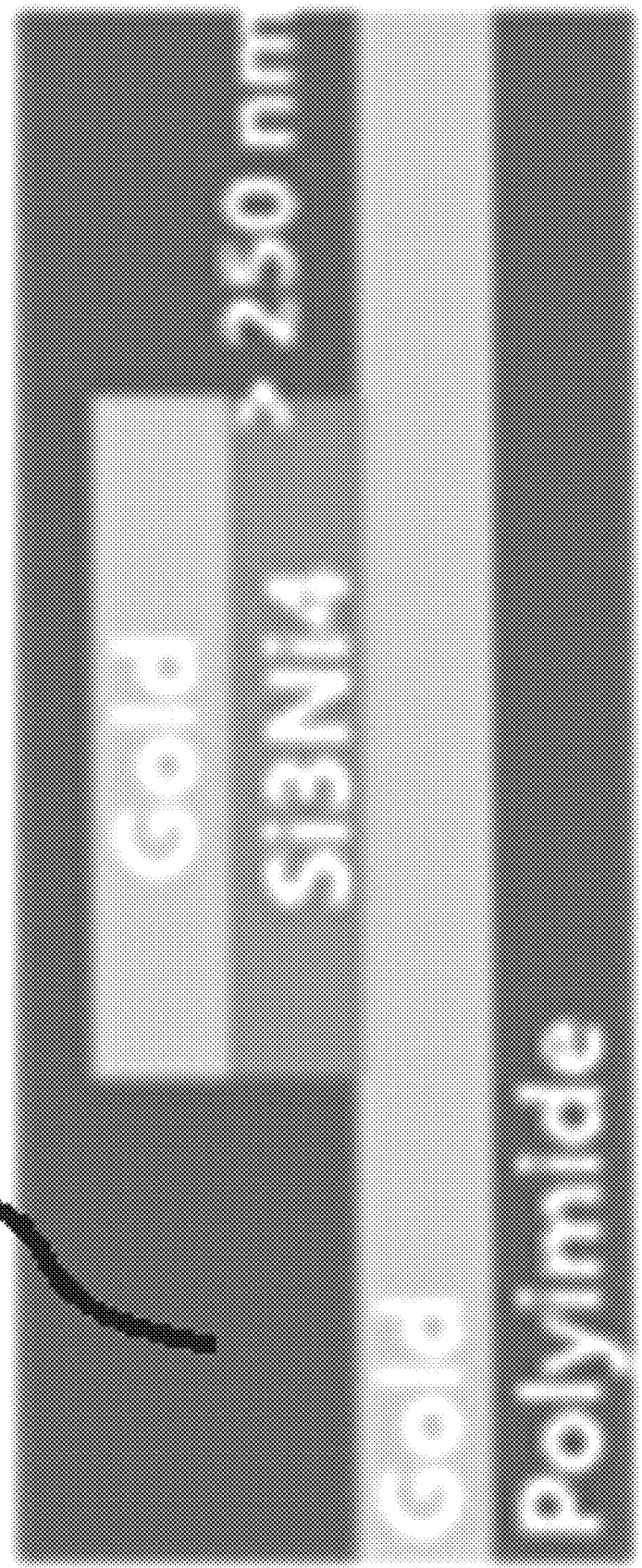

INFRARED SELECTIVE EMITTER WITH IMPROVED WEAR RESISTANCE

TECHNICAL FIELD

The present invention relates to an infrared selective emitter with improved wear resistance, and more particularly, to an infrared selective emitter that can selectively emit infrared energy in a desired wavelength band, can be easily applied to a curved surface due to its flexible characteristics, and can protect the formed surface structure of the infrared selective emitter from external stimuli such as friction, thereby remarkably improving wear resistance and thus maximizing the function of infrared selective emission, and a manufacturing method thereof.

BACKGROUND ART

In general, minimizing a signal detected by a target is called a stealth technique. Recently, as a target detection method, an infrared technology for detecting an infrared signal along with an acoustic signal for detecting a submarine has been widely used. Accordingly, in order to minimize these various detection signals, various stealth technologies are being studied.

In particular, in order to minimize the infrared signal so that it is not detected by an infrared detector, a technology for selectively emitting infrared rays has been introduced, in which a radiator that emits infrared rays is designed to lower its surface temperature or change its surface structure so that a surface emissivity is high in the wavelength band (5 to 8 µm) where the atmospheric transmittance is low, and is low in the atmospheric transmission window area (3 to 5 µm and 8 to 14 µm) where the air transmittance is high. However, conventional infrared selective emitters using such technology have limitations in practical use due to the following problems.

First, the infrared selective emitters are often used in external environments due to their characteristics, but have a problem of being vulnerable to various physical stimuli in such an external environment. More specifically, in the conventional infrared selective emitters, since the microstructure is located on the surface of the substrate, the microstructure can be easily damaged by physical stimuli such as friction from the external environment. Since the infrared selective emitter uses the resonance phenomenon of the microstructure, if the microstructure is damaged by external physical stimulation, the designed selective emission performance cannot be maintained. Therefore, it cannot be actually applied to the external environment, and thus, its utilization is greatly hindered.

Second, in order to overcome the above-mentioned problem, research on utilizing a physical protection structure for physical protection of the infrared selective emitter has been introduced, but in this case, due to the physical protection structure, there is a problem that the emissivity of selectively emitting infrared rays at a specific wavelength is lowered, and furthermore, it is disadvantageous for ultra-thin film or light weight, whereby the infrared selective emitter is not being used in actual industry.

Third, there is a problem in that the conventional infrared selective emitter is manufactured on a brittle substrate and cannot be applied to a curved surface. That is, the conventional infrared selective emitter has a problem in that it cannot be applied to a curved surface having leading edges or the like because it is inevitable to be implemented with a brittle or rigid material. This becomes a cause of greatly reducing the utilization of infrared selective emitters, given that there are many devices with curved surfaces in the military industry, which is a field where the infrared selective emitters are mainly used.

Accordingly, there is an urgent need for research on an infrared selective emitter that can selectively emit infrared energy in a desired wavelength band, can be easily applied to a curved surface due to its flexible properties, and can protect the formed surface structure of the infrared selective emitter from external stimuli such as friction, thereby improving wear resistance and thus maintaining the function of infrared selective emission as it is.

PRIOR ART LITERATURE

Patent Documents (Patent Document 0001) Korean Registered Patent No. 10-1894909 (2018.08.29)

DISCLOSURE

Technical Problem

The present invention has been devised to overcome the above-mentioned problems, and an object of the present invention is to provide an infrared selective emitter that can selectively emit infrared energy in a desired wavelength band, can be easily applied to a curved surface due to its flexible characteristics, and can protect the formed surface structure of the infrared selective emitter from external stimuli such as friction, thereby remarkably improving wear resistance and thus maximizing the function of infrared selective emission, and a manufacturing method thereof.

Technical Solution

In order to solve the above problems, the present invention provides an infrared selective emitter including: a substrate; a conductive thin film layer disposed on the substrate; a metasurface part in which a plurality of structures comprising an insulating layer and a metal layer stacked on each other are arranged in a predetermined pattern on the conductive thin film layer; and a protective coating layer having a predetermined thickness and covering the metasurface part to prevent the plurality of structures from falling off.

In addition, according to an embodiment of the present invention, the infrared selective emitter may have a maximum emissivity of 0.8 or more in an infrared wavelength band of 5 to 8 µm.

In addition, the protective coating layer may protect the metasurface part and maximize emissivity in an infrared wavelength band of 5 to 8 µm.

In addition, the protective coating layer may have a thickness of 150 to 500 nm.

In addition, the ratio (a/b) of the emissivity (b) at an infrared wavelength of 3 to 5 µm for the infrared selective emitter and the emissivity (a) at an infrared wavelength of 3 to 5 µm measured after a brush test according to the following experimental method may be 0.9 or more.
[Experimental Method]
A brush test is performed by repeating a process 30 or 50 times in which any 1.5 cm×1.5 cm area of the surface of the specimen is manually swept using a nylon brush, and an emissivity for the area is measured using Fourier transform infrared (FT-IR) equipment.

In addition, the insulating layer may be any one selected from Silicon nitride ($Si_3N_4$), Silicon oxide ($SiO_2$) and Zinc sulfide (ZnS), and have a thickness of 30 to 300 nm.

In addition, the conductive thin film layer may be any one selected from gold (Au), silver (Ag), copper (Cu), aluminum (Al) and indium tin oxide (ITO), and have a thickness of 200 nm to 1 μm.

In addition, the size of the structure may be 1 to 3 μm, and the thickness of the metal layer may be 50 to 400 nm.

In addition, the present invention provides a method for manufacturing an infrared selective emitter, the method including the steps of: (1) forming a conductive thin film layer, an insulating layer and a metal layer sequentially on a substrate; (2) forming a mask pattern layer having a predetermined pattern on the metal layer; (3) forming a metasurface part by etching to the insulating layer along the mask pattern layer so that a plurality of structures comprising an insulating layer and a metal layer stacked on each other form a predetermined pattern on the conductive thin film layer; and (4) coating a protective coating layer having a predetermined thickness and covering the metasurface part to prevent the plurality of structures from falling off.

In addition, according to an embodiment of the present invention, the protective coating layer may be formed by coating a coating solution in which a polymer material and a solvent are mixed in a ratio of 1:0.5 to 1:2.5 at a speed of 2000 to 5000 rpm.

Advantageous Effects

The infrared selective emitter according to the present invention can selectively emit infrared energy in a desired wavelength band, can be easily applied to a curved surface due to its flexible characteristics, and can protect the formed surface structure of the infrared selective emitter from external stimuli such as friction, thereby remarkably improving wear resistance and thus maximizing the function of infrared selective emission.

BEST MODES OF THE INVENTION

Figure 1:
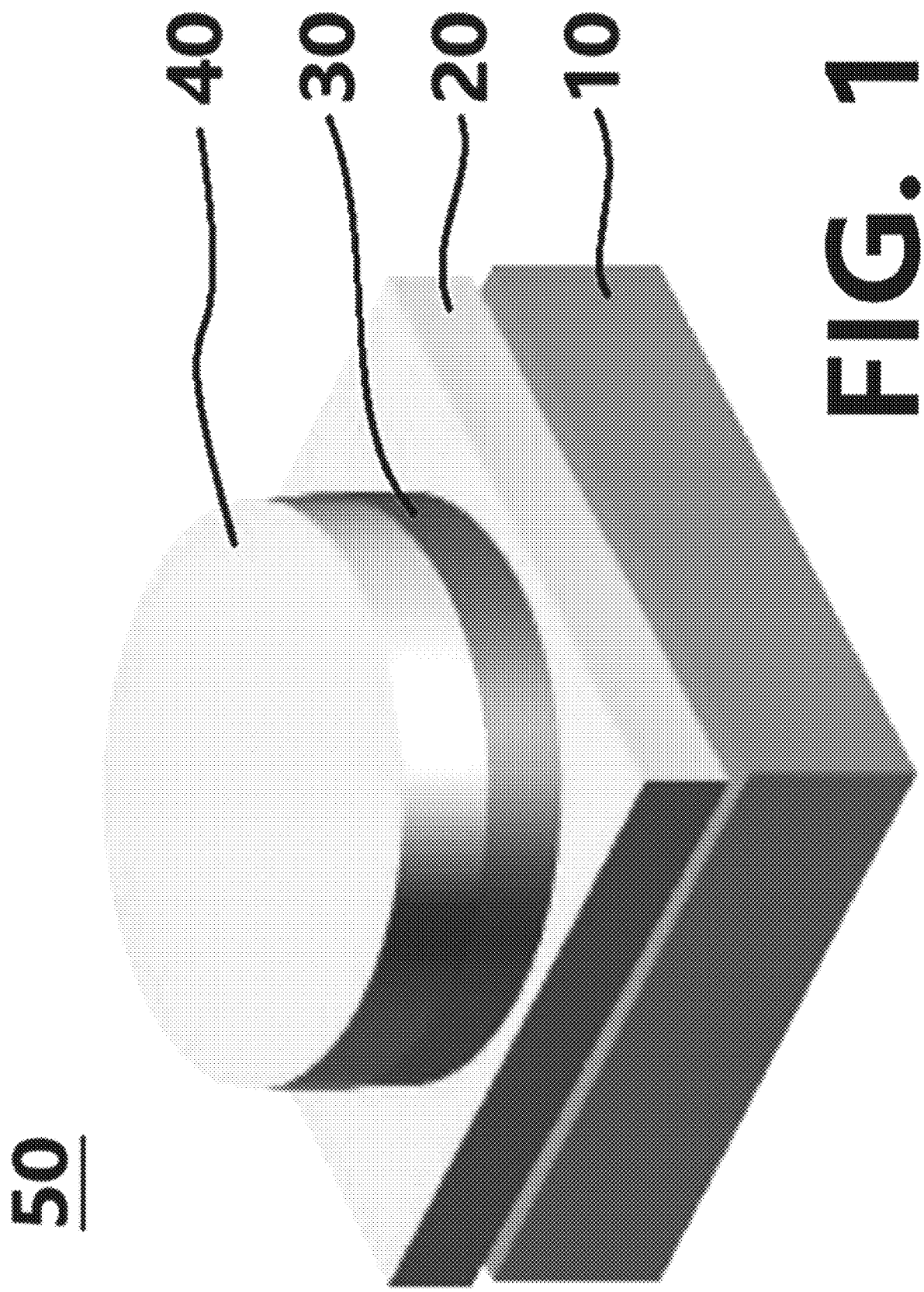
FIGS. 1 to 5 are views showing an infrared selective emitter according to the present invention.

Hereinafter, embodiments of the present invention will be described in detail so as to be easily implemented by one of ordinary skill in the art to which the present invention pertains. The present invention may be embodied in a variety of forms and is not be limited to the embodiments described herein.

As described above, the infrared selective emitters introduced in the past have problems that they are vulnerable to physical external stimuli such as friction and thus are easily damaged, or cannot maintain the function of selective infrared emission, and that they cannot be applied to a curved surface, so their use is limited.

Accordingly, the present invention has sought to solve the above-mentioned problems by providing an infrared selective emitter including: a substrate; a conductive thin film layer disposed on the substrate; a metasurface part in which a plurality of structures comprising an insulating layer and a metal layer stacked on each other are arranged in a predetermined pattern on the conductive thin film layer; and a protective coating layer having a predetermined thickness and covering the metasurface part to prevent the plurality of structures from falling off. Therefore, such an infrared selective emitter can selectively emit infrared energy in a desired wavelength band, can be easily applied to a curved surface due to its flexible properties, and can protect the formed surface structure of the infrared selective emitter from external stimuli such as friction, thereby improving wear resistance and thus maintaining the function of infrared selective emission as it is, whereby the utilization of the infrared selective emitter can be maximized.

Hereinafter, an infrared selective emitter according to the present invention will be described in detail with reference to the drawings.

The infrared selective emitter 100 according to the present invention includes: a substrate 10; a conductive thin film layer 20 disposed on the substrate 10; a metasurface part 60 in which a plurality of structures 50 comprising an insulating layer 30 and a metal layer 40 stacked on each other are arranged in a predetermined pattern on the conductive thin film layer 20; and a protective coating layer 70 having a predetermined thickness and covering the metasurface part to prevent the plurality of structures 50 from falling off.

The substrate 10 serves as a structural material for physically supporting the infrared selective emitter 100 according to the present invention. In this case, the substrate may have a flexible property so that it can be attached to the surface of an object to be camouflaged even when the surface has a curved shape. As non-limiting examples of the material for the substrate 10, materials having a flexible property such as polydimethylsiloxane (PDMS), polyimide (PI), and polyethylene terephthalate (PET) may be used. Preferably, polyimide may be used, Preferably, polyimide is used, because the thickness of the substrate can be adjusted within a desirable range by adjusting the rpm of coating, and the polyimide has a relatively low viscosity compared to other materials and thus can be manufactured into a thin thickness, which can be advantageous in reducing the radius of curvature. In addition, the substrate 10 may be in the form of a thin film capable of exhibiting sufficient flexibility, and may have a thickness of 100 nm to 10 mm, but is not particularly limited thereto.

Next, the conductive thin film layer 20 is formed on the substrate 10 and serves to impart conductivity to the infrared selective emitter according to the present invention. For the conductive thin film layer 20, a material capable of securing flexibility and further having excellent electrical conductivity may be used. Preferably, the conductive thin film layer 20 may be in the form of a thin film having a thickness sufficient to secure flexibility, and as a non-limiting example, a material having electrical conductivity such as gold (Au), silver (Ag), copper (Cu), aluminum (Al), or indium tin oxide (ITO) may be used, but is not particularly limited thereto.

In addition, the conductive thin film layer 20 may have a thickness suitable for the purpose of the present invention while exhibiting sufficient flexibility, and the thickness is not particularly limited, but as a non-limiting example, when the conductive thin film layer 20 is made of gold, may have a thickness of 200 nm to 1 µm.

Next, the infrared selective emitter according to the present invention includes a metasurface part 60 in which a plurality of structures 50 comprising an insulating layer 30 and a metal layer 40 stacked on each other are arranged in a predetermined pattern on the conductive thin film layer 20.

In general, in the case of an infrared camouflage material, an effect of reducing an infrared signal in a desired band is obtained by using a resonance phenomenon or resonance wavelength characteristics of a metal layer formed on the infrared camouflage material. The metal layer formed on the conventional infrared camouflage material has a brittle or rigid physical property, which is an inherent property of metal, and due to this property, it is difficult to manufacture or process to fit the shape of an object to be camouflaged. In addition, due to the property of the metal as described above, when the object to be camouflaged has a curved surface, When an object to be camouflaged has a curved surface, it is difficult to easily apply the infrared camouflage material even if it is manufactured in a desired size. For example, the infrared camouflage material may be mainly used for an airplane or the like in the military field. Here, when the airplane or the like has a curved surface, it is difficult to process or transform the infrared camouflage material to fit it, which greatly reduces its actual utilization.

Accordingly, the infrared selective emitter according to the present invention may include the metasurface part 60 in which a plurality of structures 50 comprising an insulating layer 30 and a metal layer 40 stacked on each other are arranged in a predetermined pattern on the conductive thin film layer 20, thereby implementing an infrared selective emitter having a flexible structure.

Figure 2:
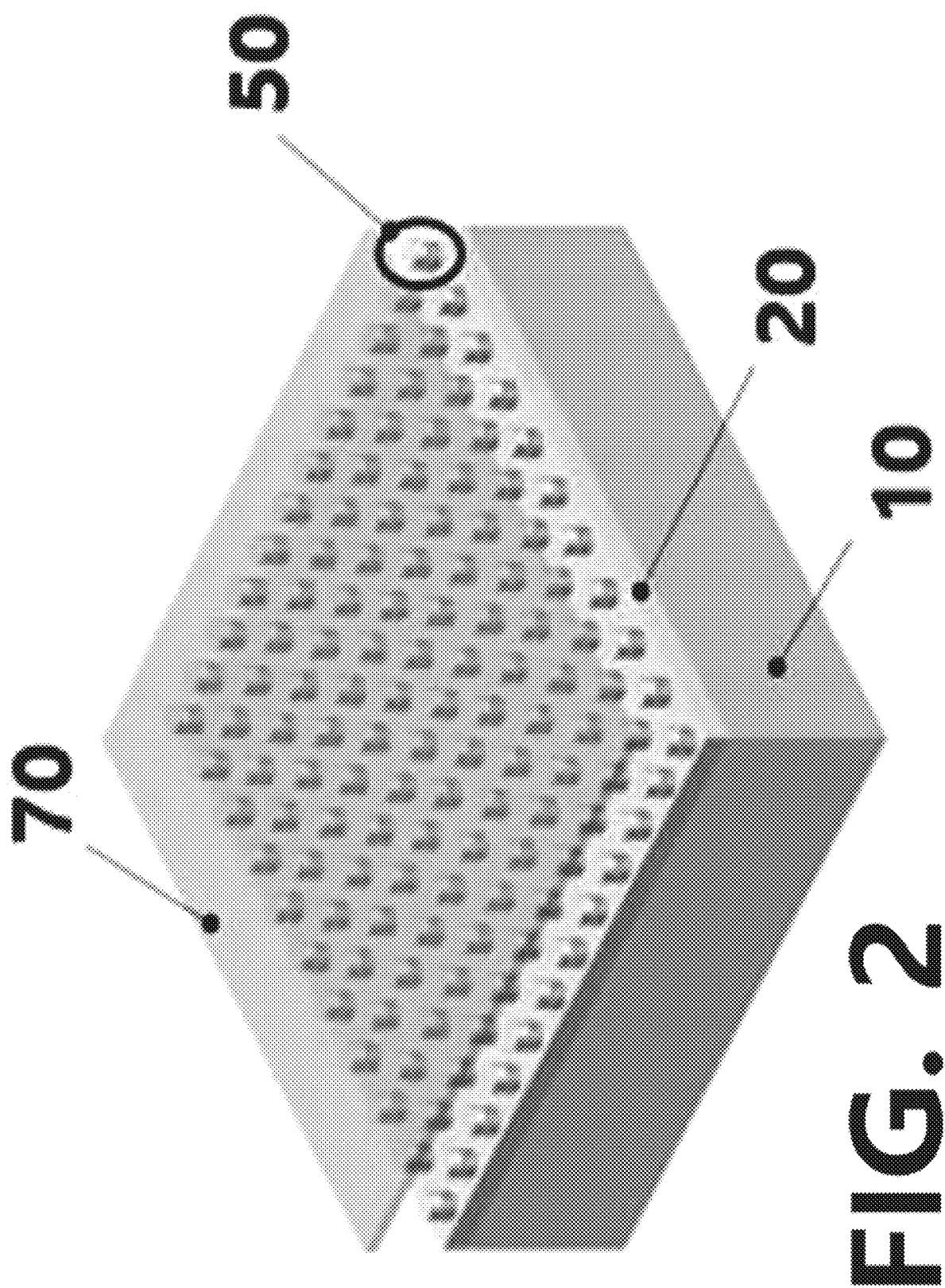
Figure 3:
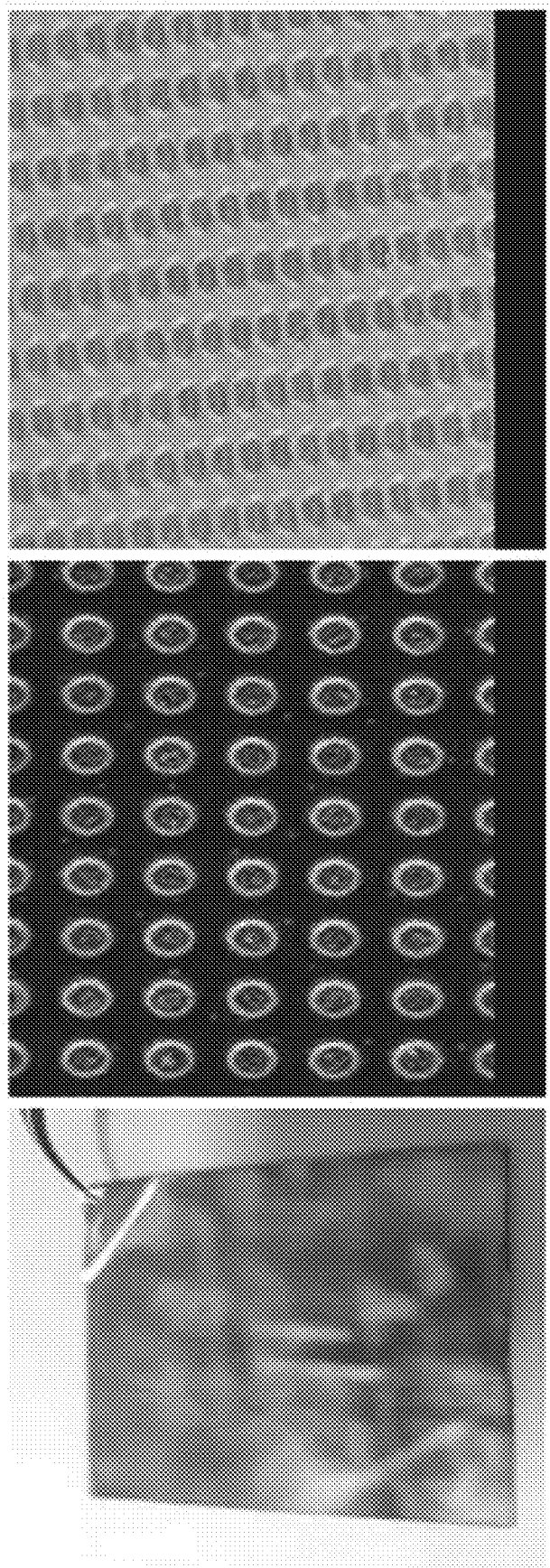
Figure 4:
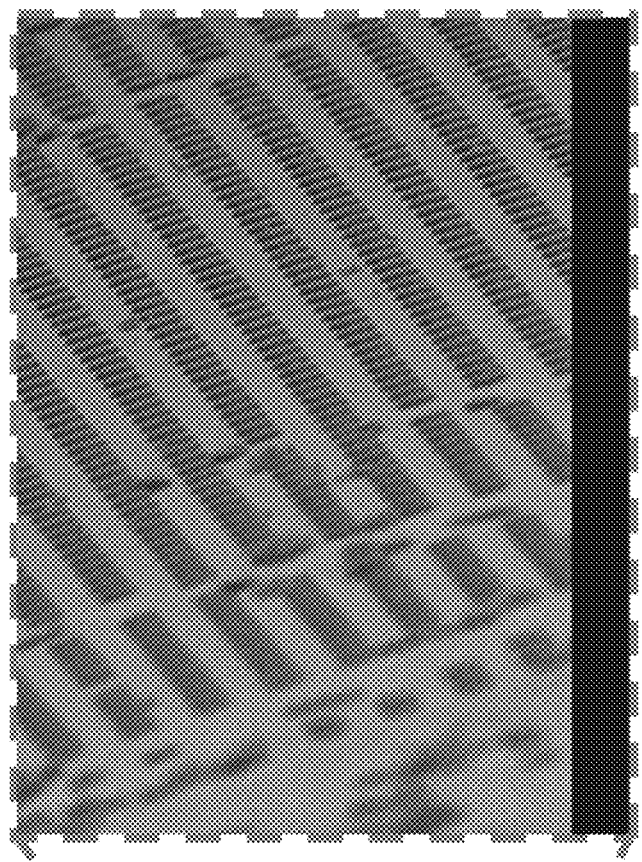
Figure 4:
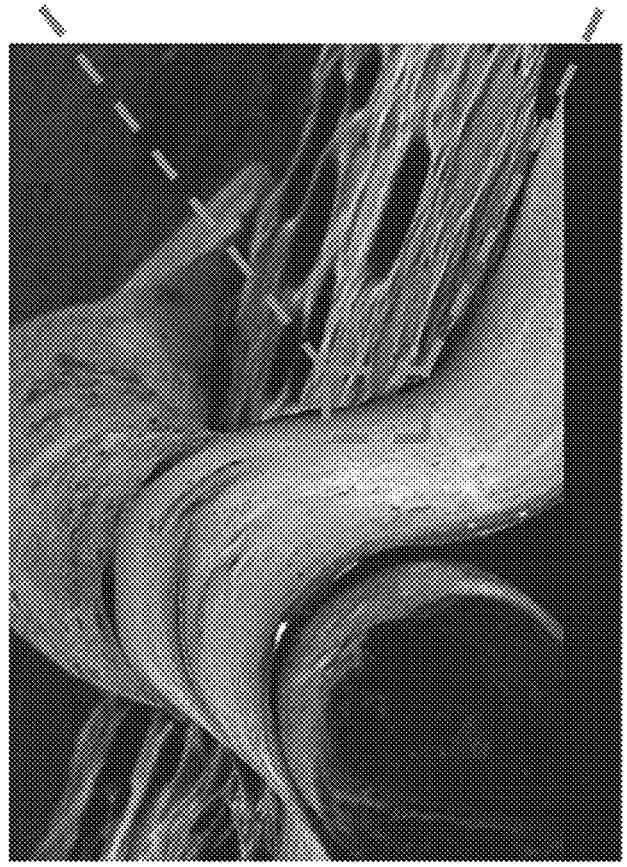
Figure 5:

More specifically, referring to FIGS. 2 and 3, in the infrared selective emitter 100 according to the present invention, the metasurface part 60 is formed on the conductive thin film layer 20, and has a structure in which the plurality of structures 50 are arranged in a predetermined pattern. As such, since the plurality of structures 50 are segmented in a predetermined pattern, even if the infrared selective emitter 100 according to the present invention is bent to form a curved surface, it can disperse the resulting stress and thus have flexibility. That is, the above-described substrate 10 and conductive thin film layer 20 are formed of a material having flexibility in itself, and the metasurface part 60 is formed in a pattern in which the plurality of structures 50 are segmented, whereby the infrared selective emitter can have flexibility enough to be attached to an object having a curved surface, as shown in FIGS. 4 and 5. As a result, due to the metasurface part 60 having such a segmented pattern, the infrared selective emitter 100 according to the present invention can have a radius of curvature of 250 µm or more. If the radius of curvature is less than 250 µm, it may be difficult to secure sufficient flexibility for the purpose of the present invention.

Meanwhile, the plurality of structures 50 have a structure in which an insulating layer 30 and a metal layer 40 are stacked.

In general, the conventionally introduced infrared selective emitters include an insulating layer (or dielectric layer) of a brittle material, and exhibit radio wave absorption performance by controlling impedance using a carbon-based dielectric loss material. The dielectric loss material can convert electromagnetic waves into thermal energy through Joule heating, wherein the real part of the permittivity corresponds to a capacitor in the circuit, and the imaginary part corresponds to resistance. That is, the higher the imaginary part of the permittivity, the more radio wave absorption can be expected in general, which is called dielectric loss. The infrared camouflage materials using such dielectric loss are generally not flexible due to brittle materials and their structural characteristics, and therefore, have a limitation that application to curved surfaces is impossible.

However, according to the present invention, the metasurface part 60 has a meta-material structure in which the plurality of structures 50 are stacked, and the thickness of the plurality of structures 50, the repetition pitch, and the size of the pattern (metal layer) can be adjusted, whereby depending on the purpose and material used, infrared selective emission characteristics can be exhibited to reduce infrared signals in a suitable wavelength band used for infrared detection.

Next, the protective coating layer 70 covers the metasurface part 60 with a predetermined thickness to prevent the plurality of structures 50 according to the present invention from being detached from the substrate by external physical stimulation.

Figure 6:
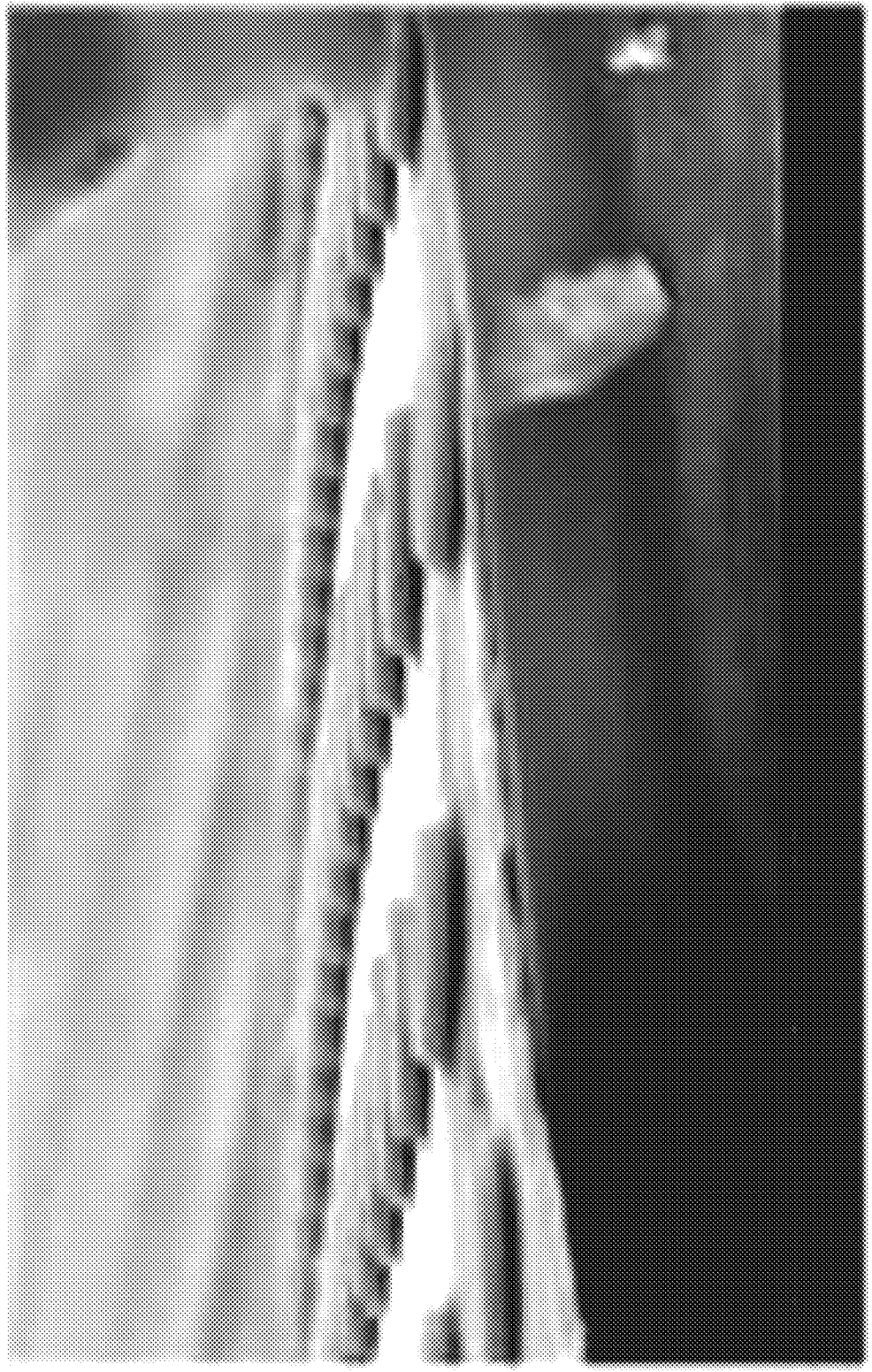
FIGS. 6 and 7 are views showing an infrared selective emitter including a protective coating layer according to the present invention.

In general, infrared selective emitters are often used in external environments due to their characteristics, but have a problem of being vulnerable to various physical stimuli in such an external environment. More specifically, in the conventional infrared selective emitters, since the microstructure is located on the surface of the substrate as shown in FIG. 6, the microstructure can be easily damaged by physical stimuli such as friction from the external environment. Since the infrared selective emitter uses the resonance phenomenon of the microstructure, if the microstructure is damaged by external physical stimulation, the designed selective emission performance cannot be maintained. Therefore, it cannot be actually applied to the external environment, and thus, its utilization is greatly hindered.

Figure 7:
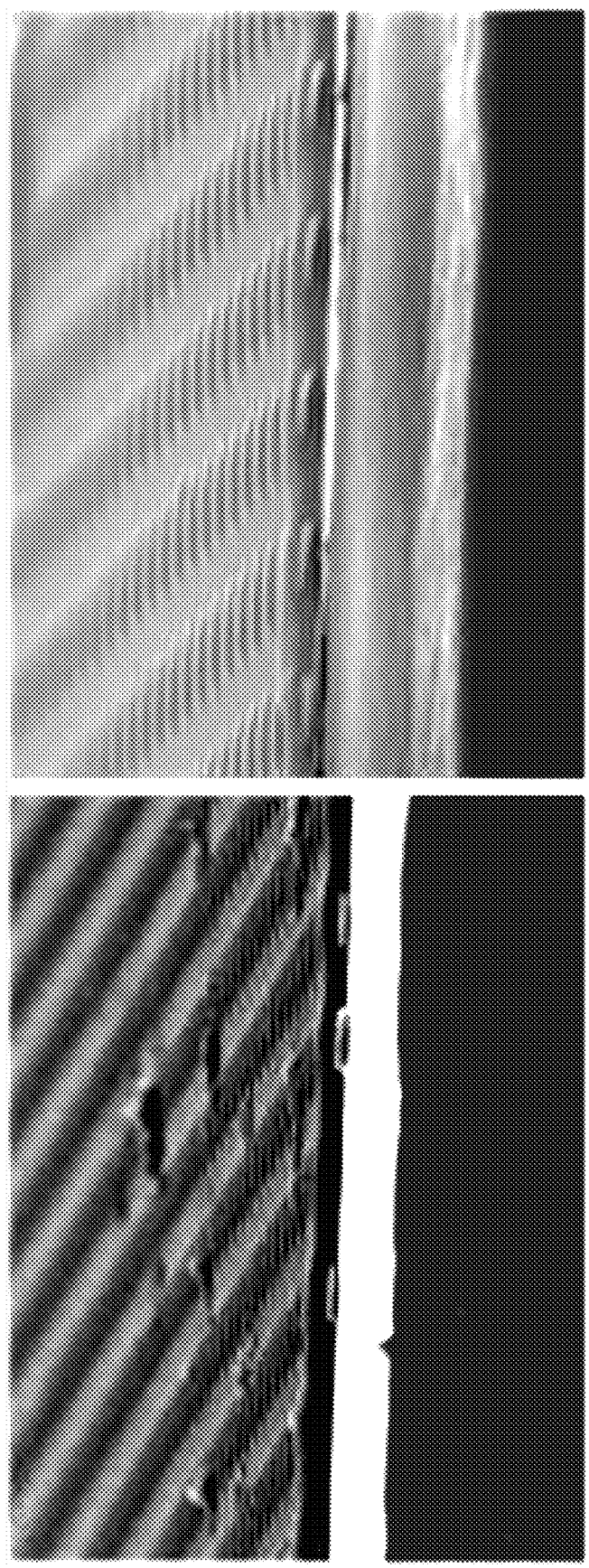

However, according to the present invention, as shown in FIG. 7, the protective coating layer 70 with a predetermined thickness is formed on the metasurface part 60 in order to prevent the plurality of structures 50 from being detached from the substrate by external physical stimulation, thereby solving the above-described problem.

More specifically, in the case of the infrared selective emitter of FIG. 8(a) not including the protective coating layer 70 according to the present invention, it can be seen even with the naked eye that many scratches occurred in a brush test according to the following experimental method.
[Experimental Method]

A brush test is performed by repeating a process 30 to 50 times in which any 1.5 cm×1.5 cm area of the surface of the specimen is manually swept using a nylon brush, and an emissivity for the area is measured using FT-IR equipment.

However, referring to FIG. 8(b), in the infrared selective emitter including the protective coating layer 70 according to the present invention, it can be seen that relatively less surface damage occurred in the brush test according to the above experimental method, compared to FIG. 8(a). This difference occurs because, in the case of the present invention, as shown in FIG. 9, the protective coating layer 70 can absorb physical and chemical stimuli from the outside to protect the protective coating layer 70.

That is, although spalling may occur in the protective coating 70 itself, the protective coating layer 70 according to the present invention can prevent damage to the structure 50 from external physical and chemical stimulation, thereby minimizing the effect on the performance of infrared selective emission using the resonance phenomenon of the structure 50.

Figure 8:
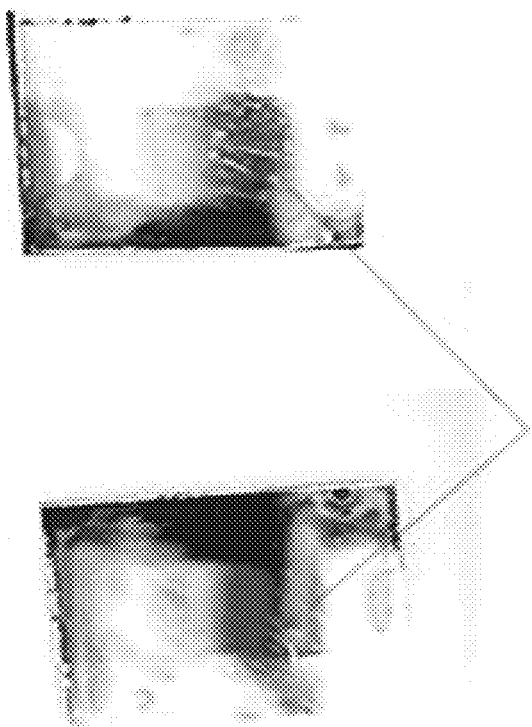
FIGS. 8 to 10 are views for comparing an infrared selective emitter including a protective coating layer according to an embodiment of the present invention and an infrared selective emitter without the protective coating layer.
Figure 9:
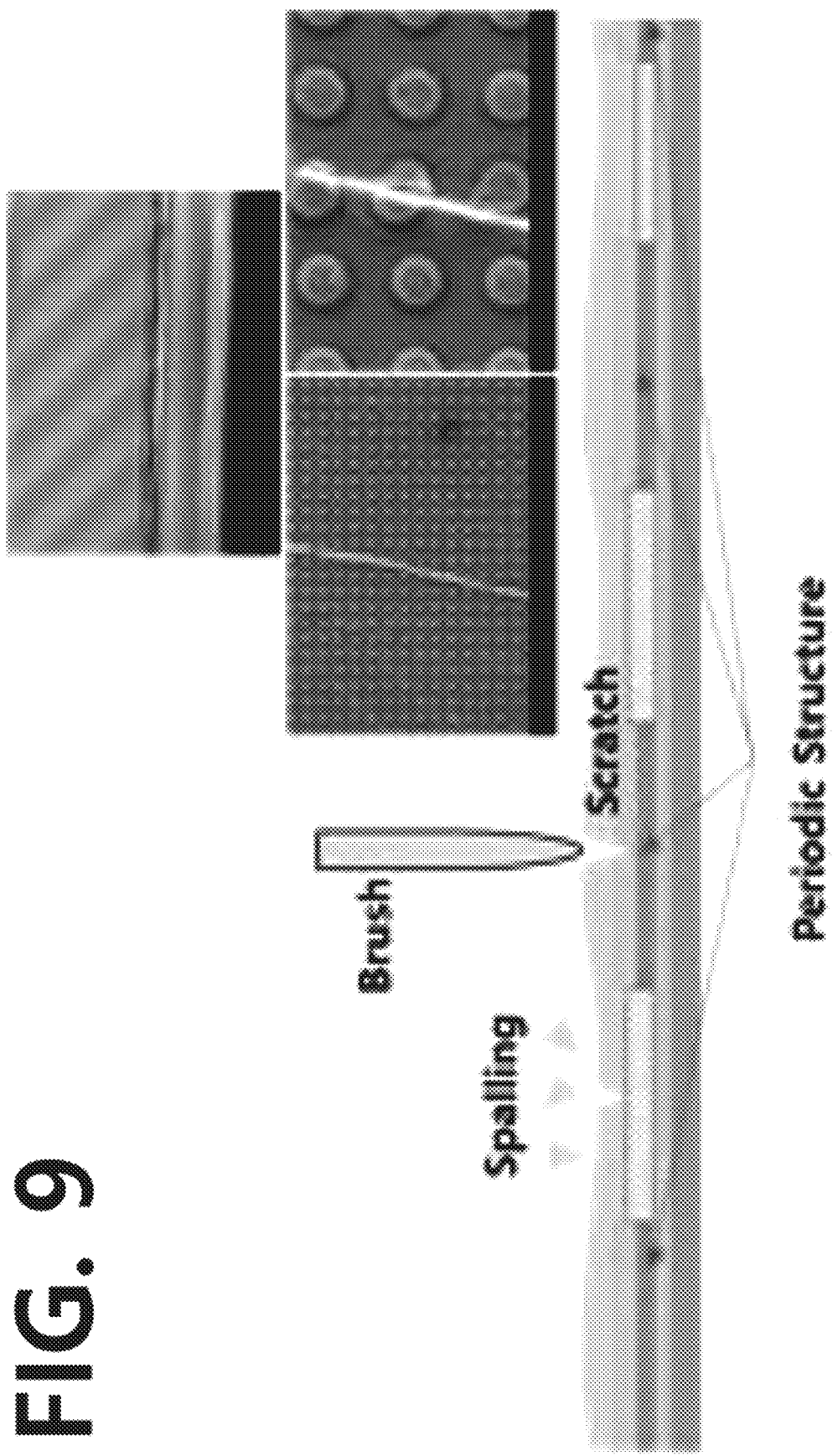
Figure 10:
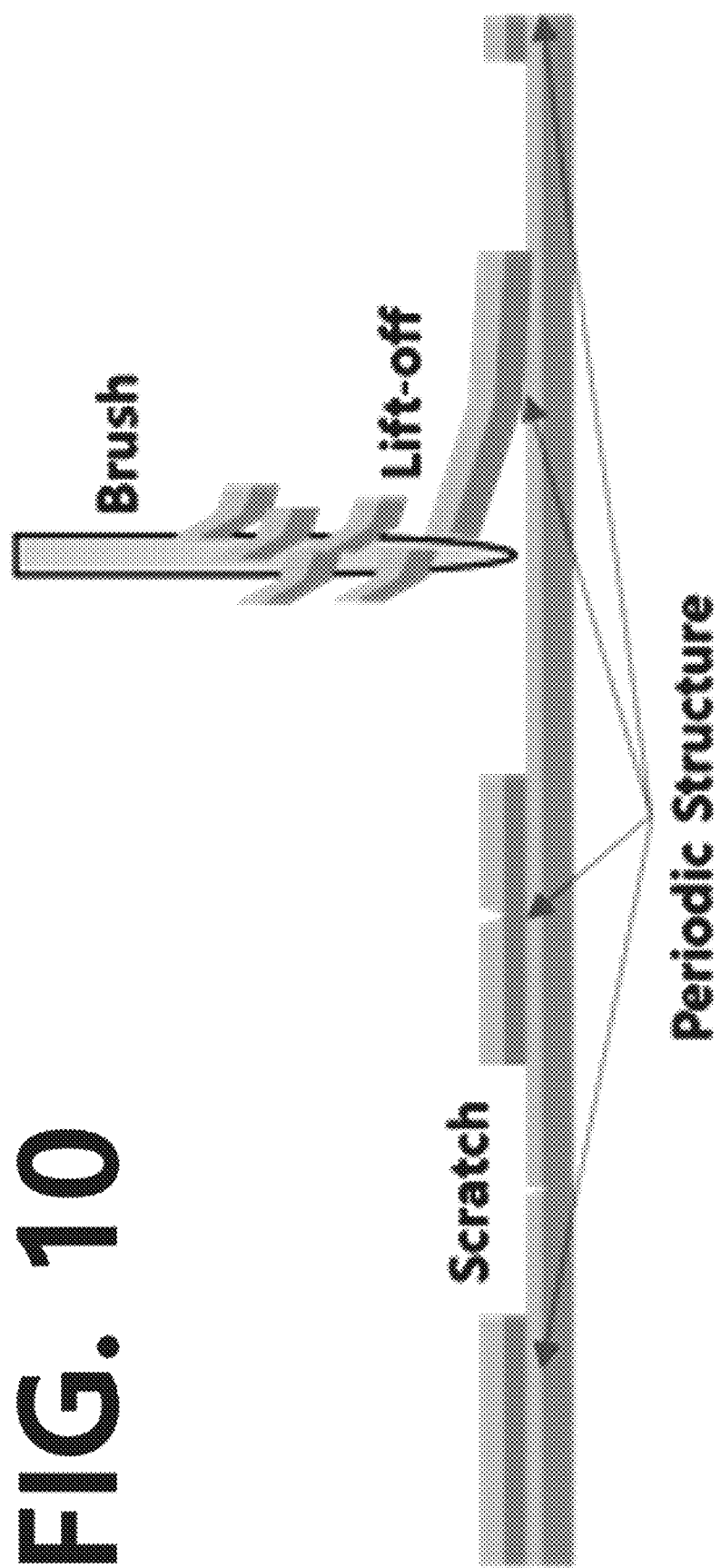

In contrast, as shown in FIG. 10, in the case of the infrared selective emitter of FIG. 8(*a*) that does not include the protective coating layer 70, the structure 50 itself is deformed or damaged by external physical and chemical stimulation, whereby the performance of infrared selective emission using the resonance phenomenon of the structure 50 may not be exhibited, or the desired degree of emission performance may not be exhibited.

Figure 11A:
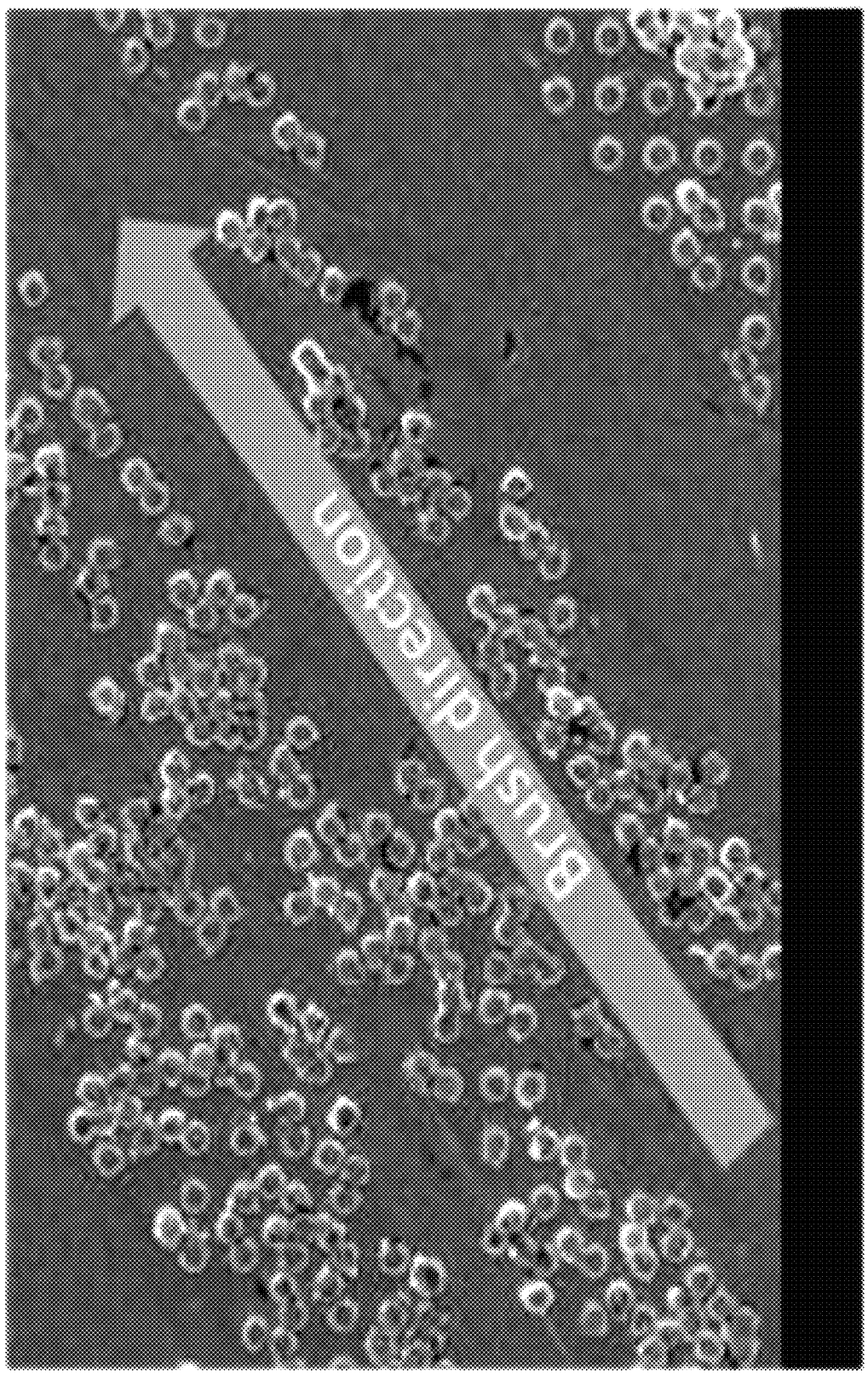
FIGS. 11 and 12 are views illustrating a selective emission function of an infrared selective emitter including a protective coating layer according to an embodiment of the present invention and an infrared selective emitter without the protective coating layer.
Figure 11B:
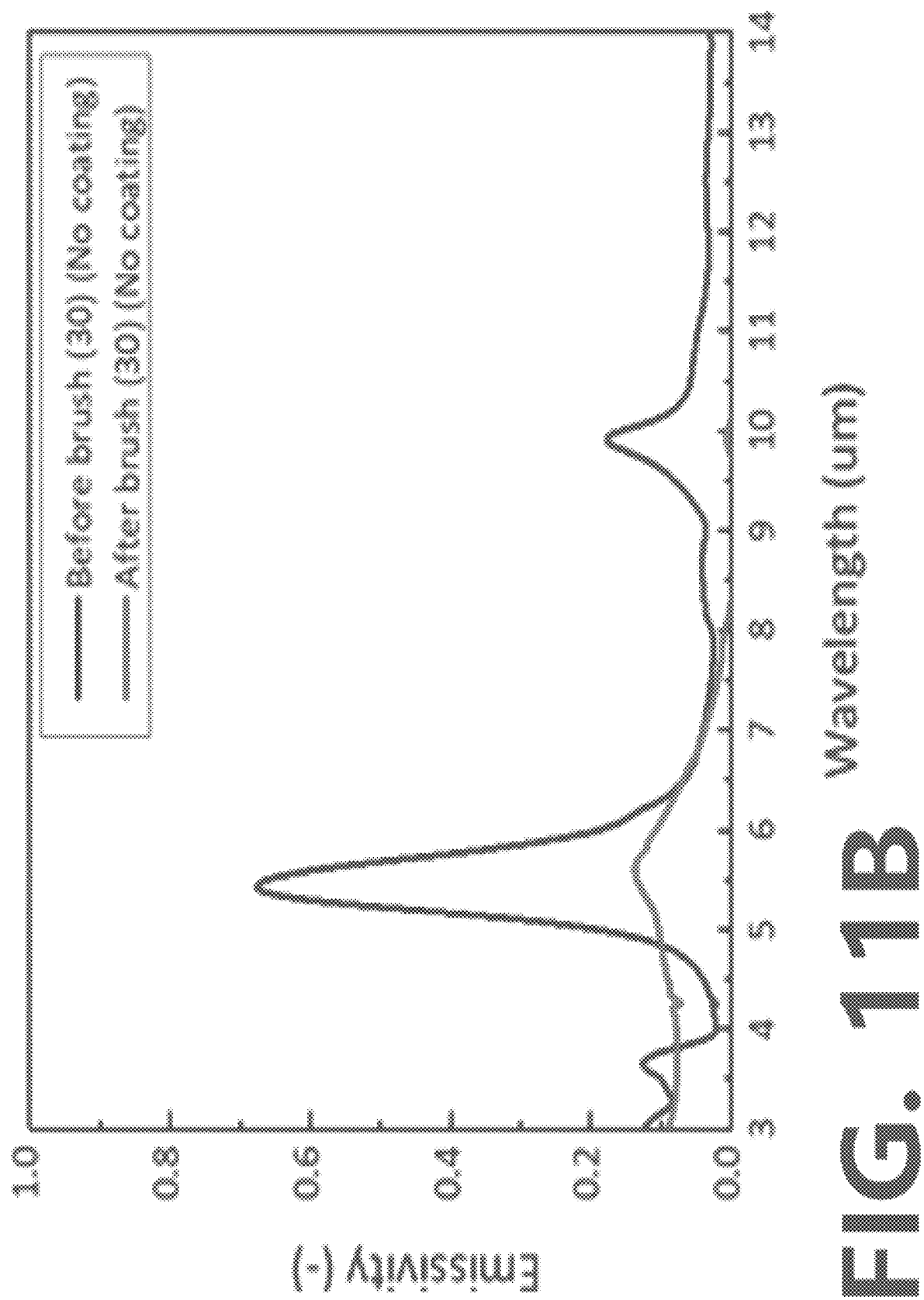

Referring to FIGS. 11A to 11C to explain the effect of maintaining the infrared selective emission performance by the protective function of the protective coating layer 70 in more detail, in the case of the infrared selective emitter not provided with the protective coating layer 70, as shown in FIG. 11*a*, the internal structures are damaged by external physical stimuli, or the arrangement structure in which the internal structures are spaced apart at certain intervals is destroyed. As a result, as shown in FIGS. 11*b* and 11*c*, it can be seen that the emissivity in the infrared wavelength band of 5 to 8 μm is significantly reduced by up to 300% or more by external physical stimulation.

Figure 12A:
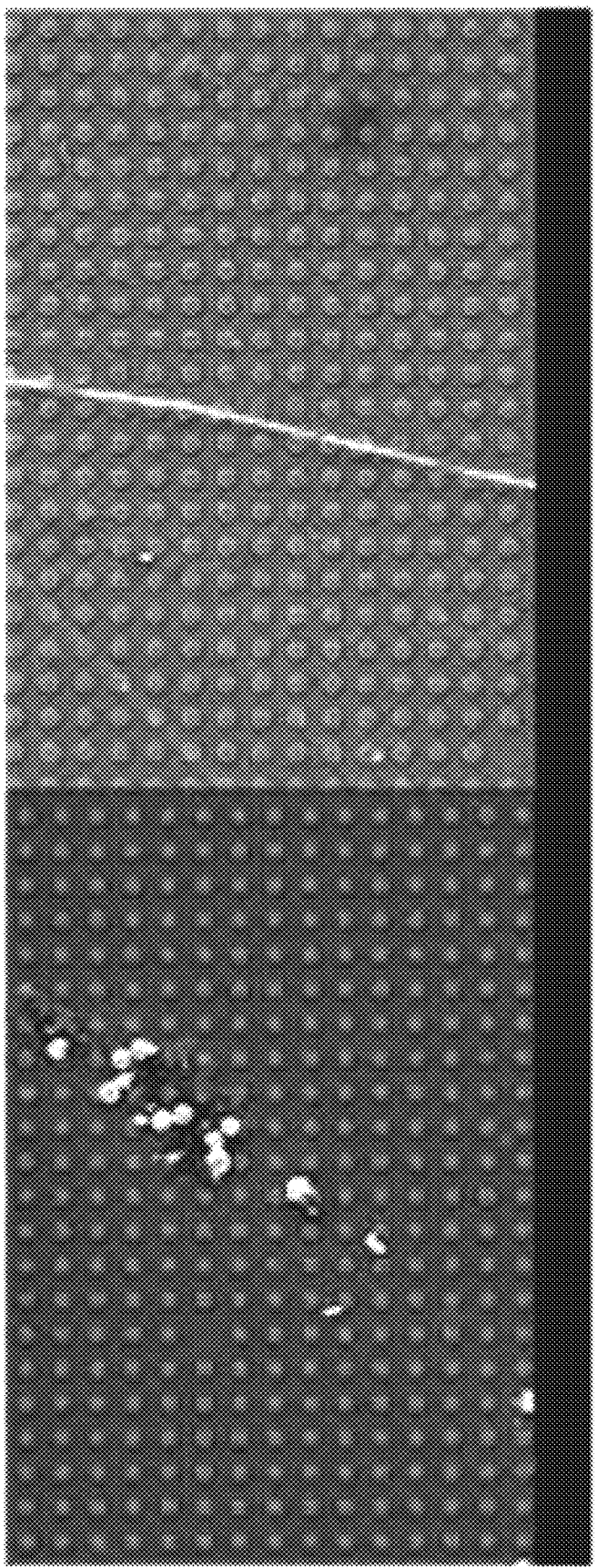
Figure 12B:
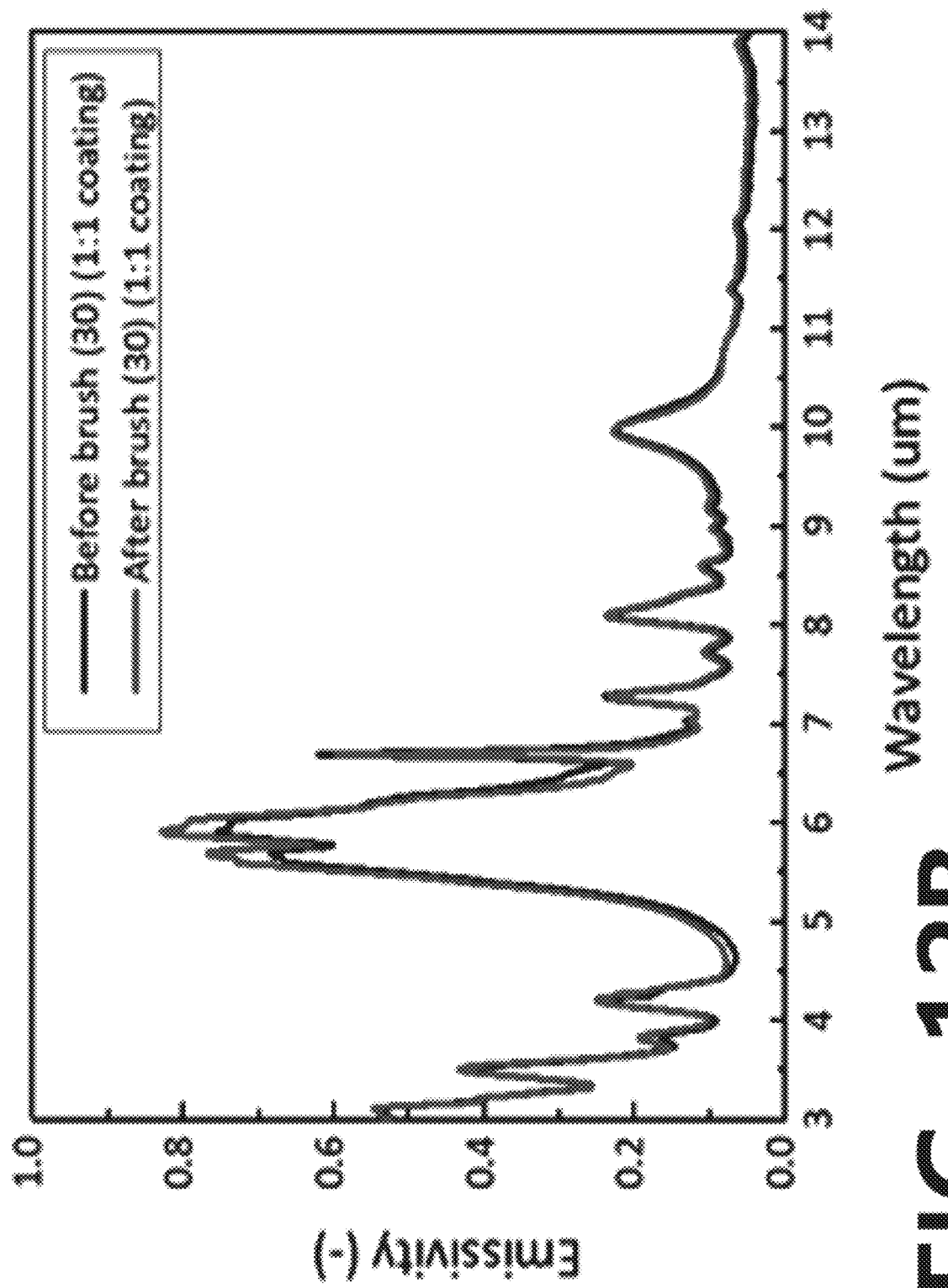
Figure 12C:
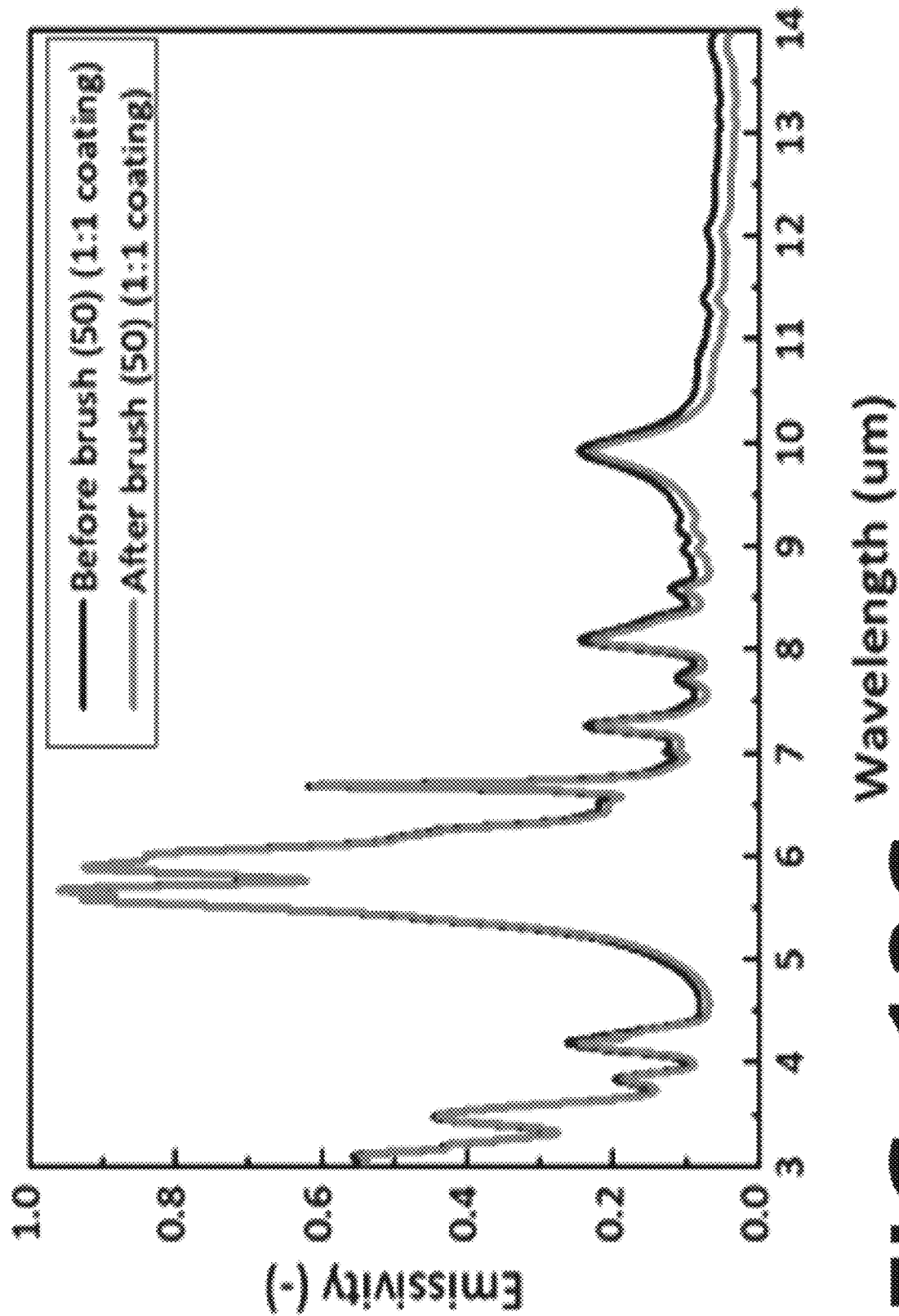

In contrast, in the case of the infrared selective emitter according to the present invention having the protective coating layer 70, as shown in FIG. 12*a*, it can be seen that due to the protective coating layer 70, the structure 50 formed on the metasurface part 60 is not damaged and the arrangement structure is not deformed despite external physical stimulation. As a result, as shown in FIGS. 12*b* and 12*c*, it can be seen that the emissivity in the infrared wavelength band of 5 to 8 μm is hardly lowered by external physical stimulation.

In addition, the protective coating layer 70 can maximize the infrared selective emission performance as well as the protection function of the infrared selective emitter according to the present invention. That is, the protective coating layer 70 replaces the air portion therewith, thereby increasing the effective permittivity, and maximizing the infrared selective emission performance to induce a broadband in which the maximum emissivity shows a value of 0.8 or more in the infrared wavelength band of 5 to 8 μm. That is, compared to FIGS. 11B and 11C showing the emissivity of the infrared selective emitter not provided with the protective coating layer 70, it can be seen that the infrared selective emitter provided with the protective coating layer 70 according to the present invention exhibits significantly broadband emission performance.

In other words, the present invention includes the protective coating layer 70 as described above, thereby performing a broadband function of maximizing the infrared selective emission performance in addition to a protective function of preventing the plurality of structures 50 from being detached from the substrate by external physical stimulation, wherein such functions can be controlled by the thickness of the protective coating layer 70 according to the present invention.

Figure 16:
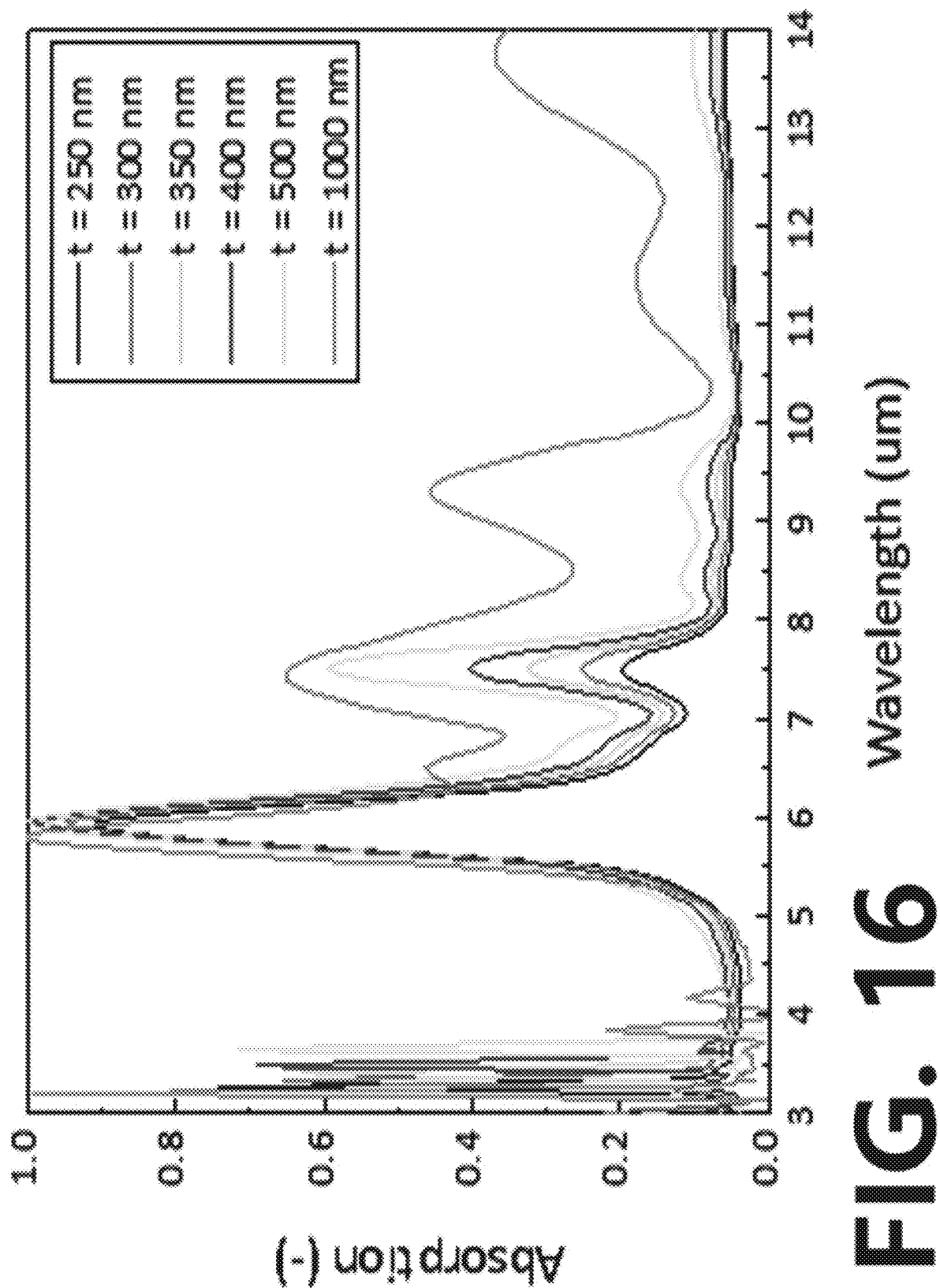
FIGS. 16 to 19 are graphs and schematic diagrams showing the effect of a thickness of a protective coating layer of an infrared selective emitter according to the present invention.

For example, as shown in FIG. 16, when the thickness (t) of the protective coating layer 70 according to an embodiment of the present invention increases from 250 nm to 1000 nm, it can be seen that as the thickness increases, there is no change in the peak, but the emissivity increases overall. However, it can be seen that when the thickness exceeds 500 nm, it is difficult to control the selective emission performance in the desired wavelength band, and therefore, the protective coating layer 70 must be designed to have a thickness of less than a certain thickness in order to maintain infrared selective emission characteristics.

Figure 17A:
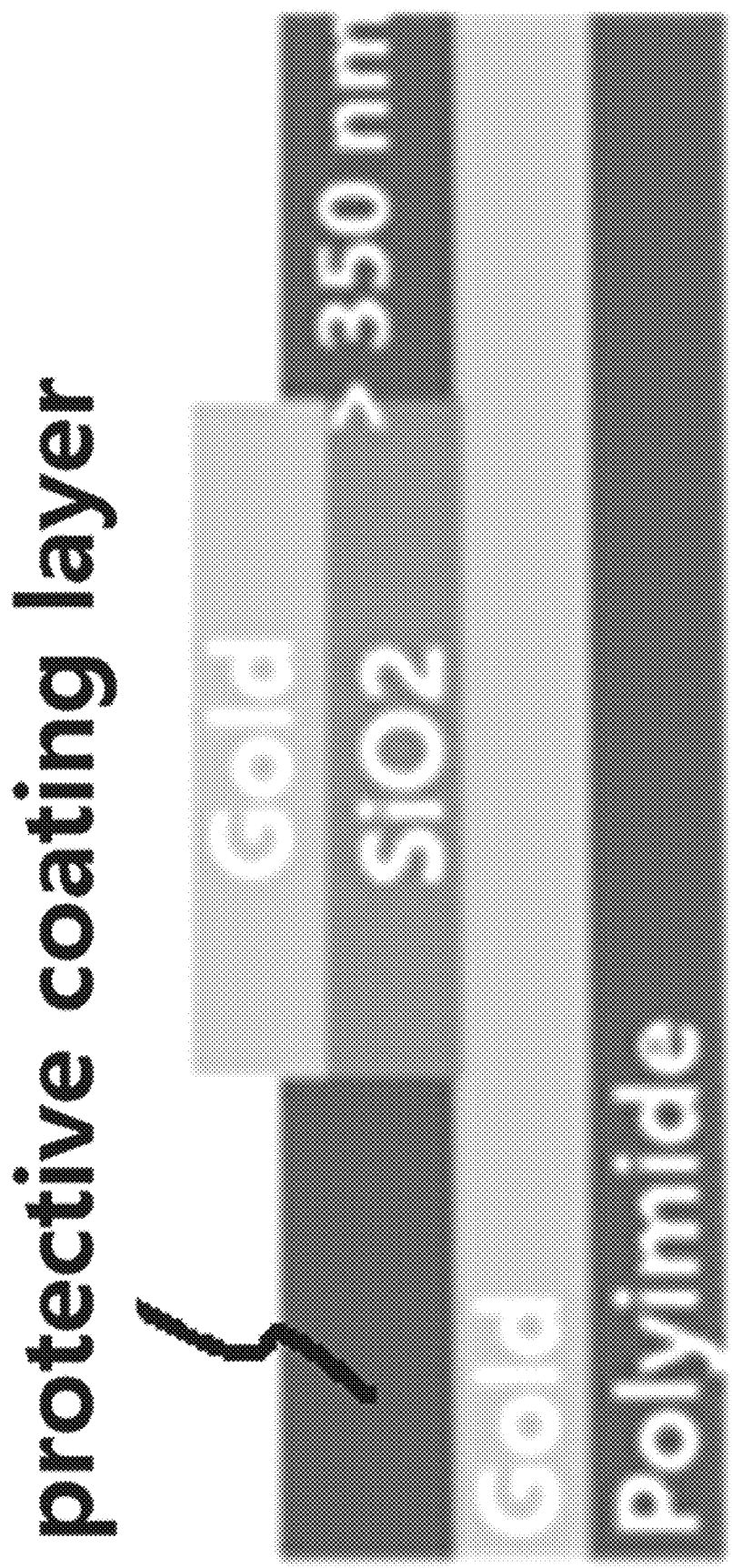
Figure 17B:
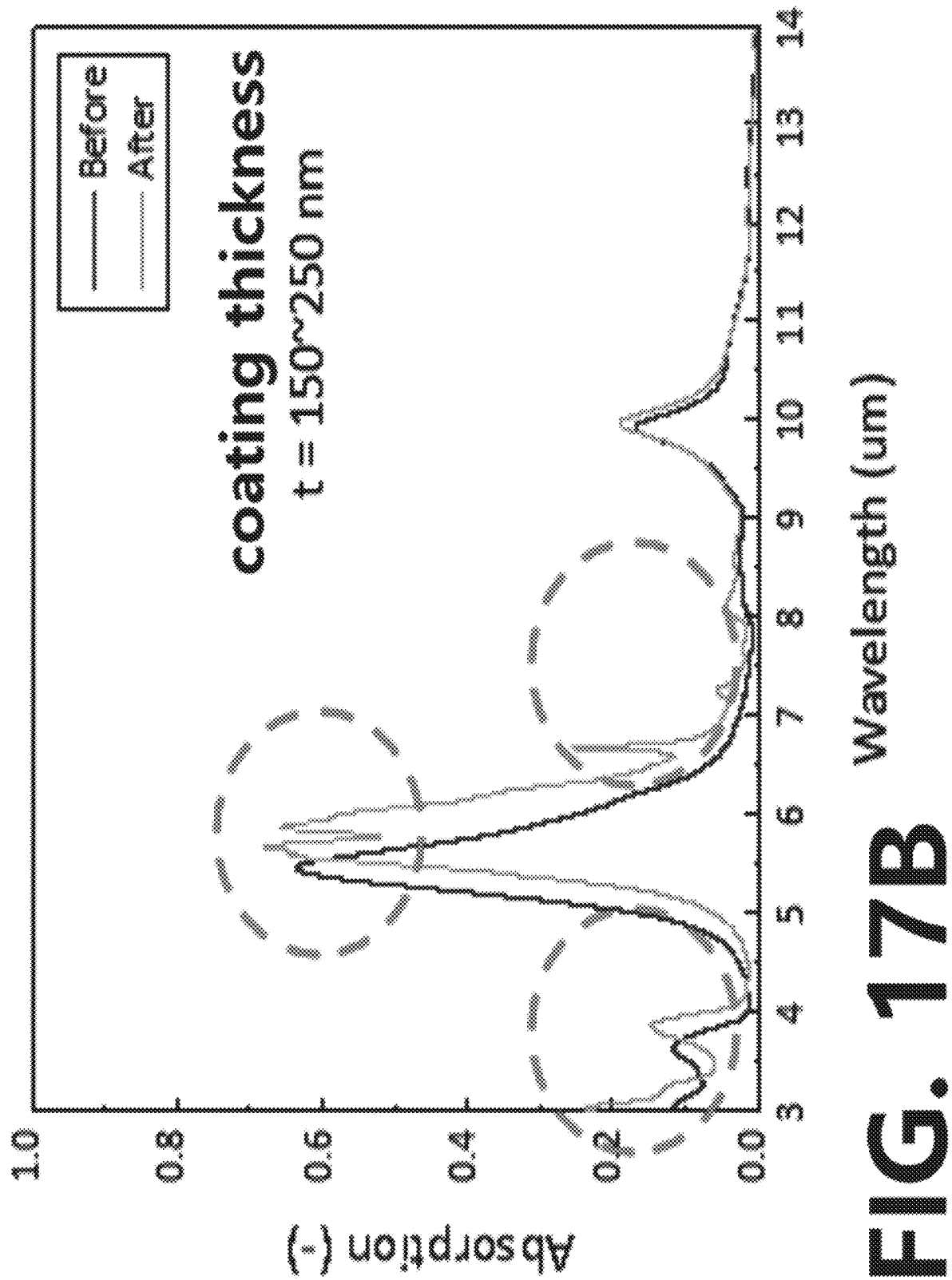
Figure 17C:
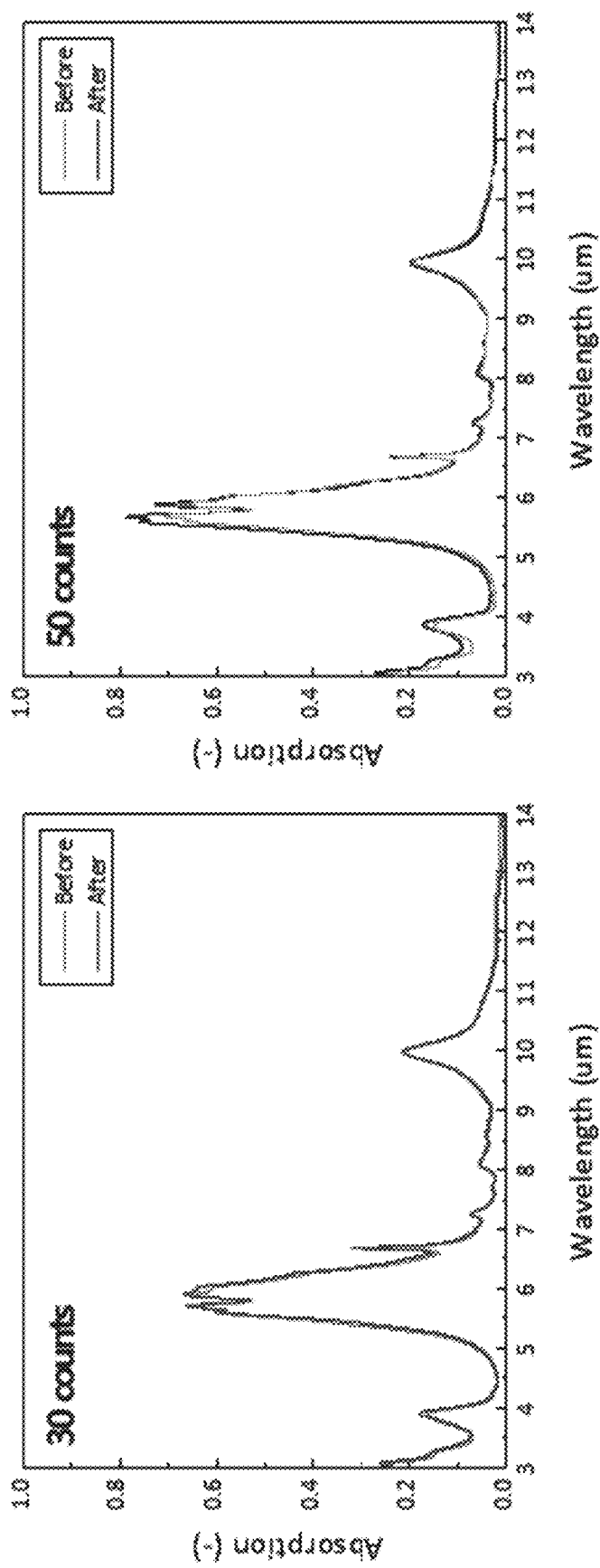

As another example, it can be seen that when the protective coating layer 70 according to another embodiment of the present invention is coated so that the thickness thereof is thinner than the height (350 nm) of the plurality of structures 50 as shown in FIG. 17A, there is no change in the emissivity performance after brush test (30 or 50 times) as shown in FIGS. 17B and 17C. Accordingly, it can be seen that even when the protective coating layer 70 is formed thinner than the height of the plurality of structures 50, the selective emission performance is maintained as it is.

Figure 18B:
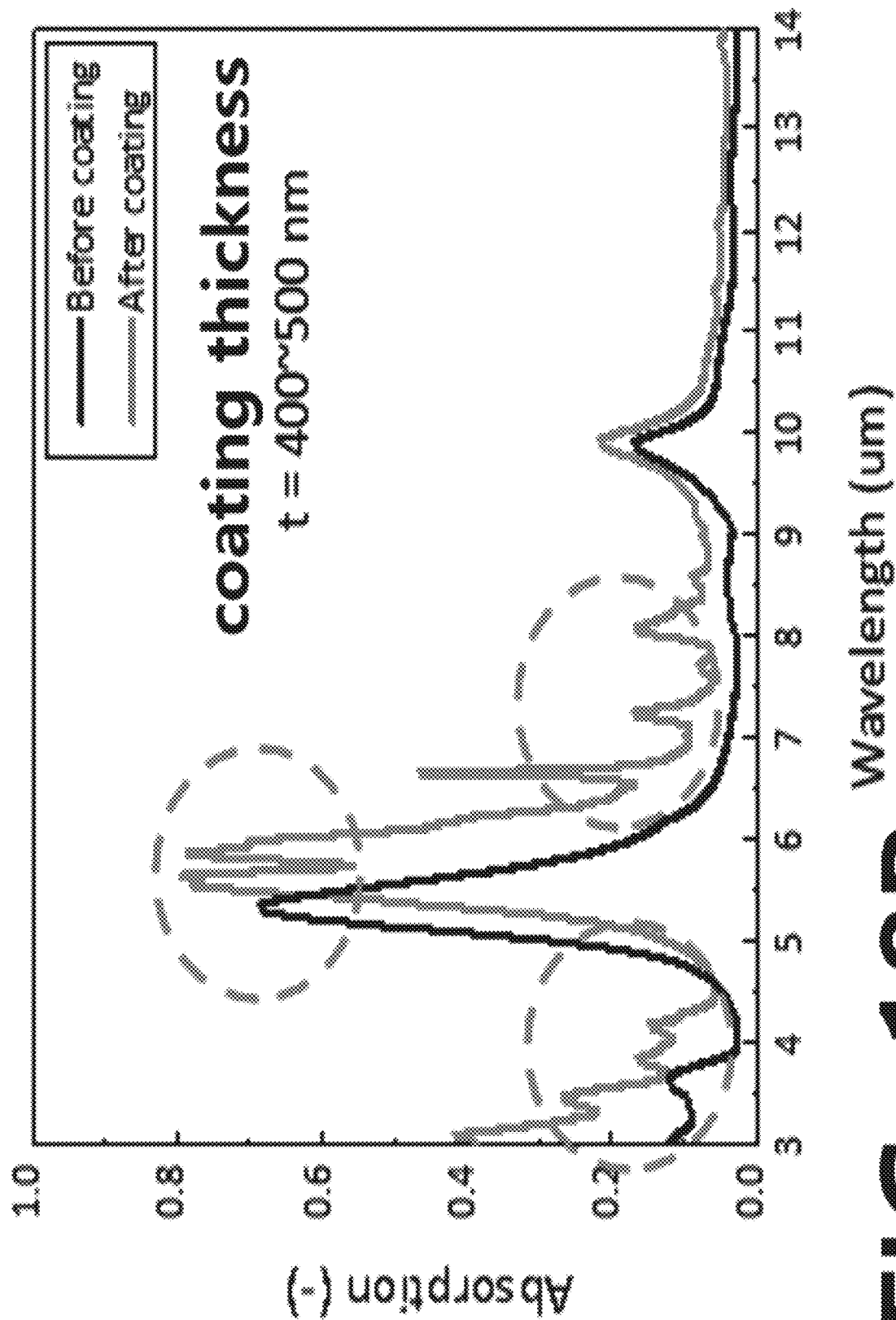

As yet another example, it can be seen that when the protective coating layer 70 according to another embodiment of the present invention is coated so that the thickness thereof is thicker than the height (350 nm) of the plurality of structures 50 as shown in FIG. 18A, the selective emission performance is maintained as it is as shown in FIG. 18B.

In summary, the thickness of the protective coating layer 70 may be 150 to 500 nm, more preferably 200 to 500 nm. If the thickness of the protective coating layer 70 is less than 150 nm, the performance of the protective coating layer 70 for protecting the metasurface part 60 and the plurality of structures 50 may deteriorate. In addition, if the thickness of the protective coating layer 70 exceeds 500 nm, the thickness of the protective coating layer 70 is excessively thick, and thus, it is difficult to realize an ultra-thin film and may be disadvantageous in terms of flexibility.

As described above, the infrared selective emitter according to the present invention can selectively emit infrared energy in a desired wavelength band, can be easily applied to a curved surface due to its flexible properties, and can protect the formed surface structure of the infrared selective emitter from external stimuli such as friction, thereby improving wear resistance and maximizing the function of infrared selective emission, whereby the utilization of the infrared selective emitter can be maximized.

Next, a method of manufacturing the infrared selective emitter 100 according to the present invention will be described with reference to FIGS. 13 to 15. However, in order to avoid duplication, descriptions of parts having the same technical concept as the above-described infrared selective emitter 100 will be omitted.

The method of manufacturing the infrared selective emitter according to the present invention includes the steps of: (1) forming a conductive thin film layer, an insulating layer and a metal layer sequentially on a substrate; (2) forming a mask pattern layer having a predetermined pattern on the metal layer; (3) forming a metasurface part by etching to the insulating layer along the mask pattern layer so that a plurality of structures comprising an insulating layer and a metal layer stacked on each other form a predetermined pattern on the conductive thin film layer; and (4) coating a protective coating layer having a predetermined thickness and covering the metasurface part to prevent the plurality of structures from falling off.

Step (1) is a step of sequentially forming a conductive thin film layer, an insulating layer, and a metal layer on a substrate.

Figure 13:
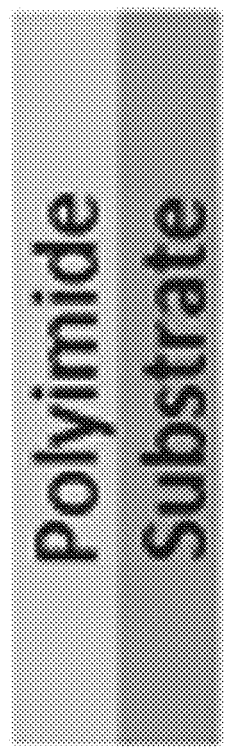
FIGS. 13 to 15 are schematic diagrams for explaining a method of manufacturing an infrared selective emitter according to the present invention.
Figure 13:
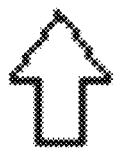
Figure 13:
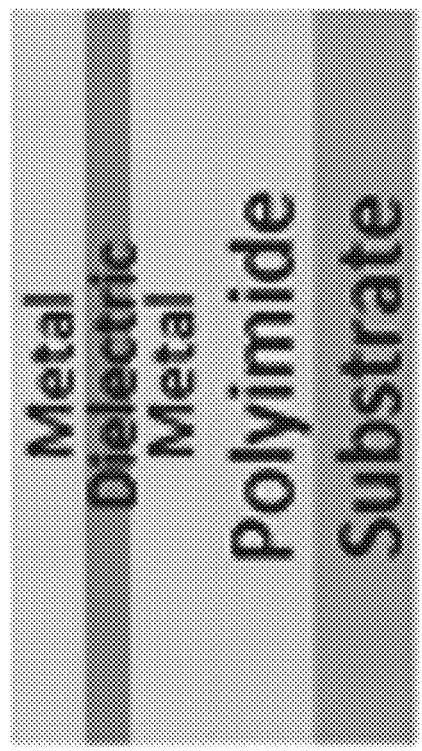
Figure 14:
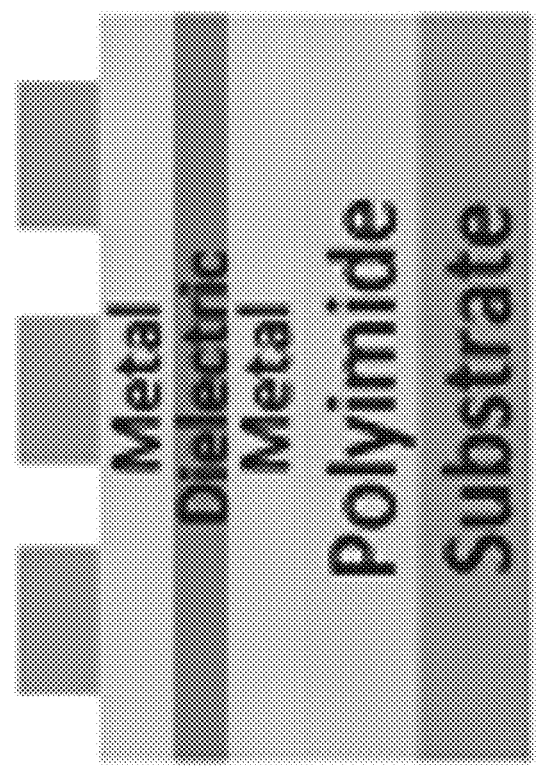
Figure 14:
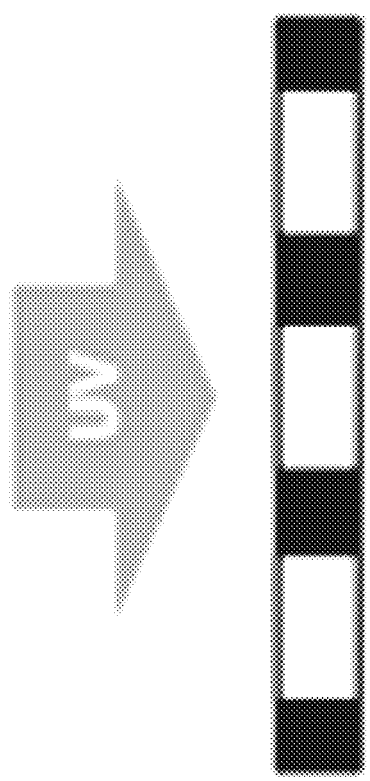
Figure 14:

More specifically, referring to FIG. 13, in step (1), the conductive thin film layer, the insulating layer, and the metal layer are sequentially deposited on the substrate of the infrared selective emitter 100 according to the present invention. In this case, as the deposition method, any known conventional deposition method suitable for the purpose of the present invention may be used, and for example, physical vapor deposition or chemical vapor deposition may be performed. The physical vapor deposition or chemical vapor deposition may include DC sputtering, magnetron sputtering, electron beam evaporation, thermal evaporation, laser molecular beam epitaxy (LMBE), pulsed laser deposition (PLD), vacuum deposition, atomic layer deposition (ALD), or plasma enhanced chemical vapor deposition (PECVD).

Next, step (2) is a step of forming a mask pattern layer having a predetermined pattern on the metal layer. That is, referring to FIG. 14, the mask pattern layer may be formed by any known conventional method suitable for the purpose of the present invention. Preferably, a photoresist (PR) is coated on the metal layer, and UV exposure is performed to form the mask pattern layer spaced apart at predetermined intervals.

Next, step (3) is a step of forming a metasurface part by etching to the insulating layer along the mask pattern layer so that a plurality of structures comprising the insulating layer and the metal layer stacked on each other form a predetermined pattern on the conductive thin film layer.

Figure 15:
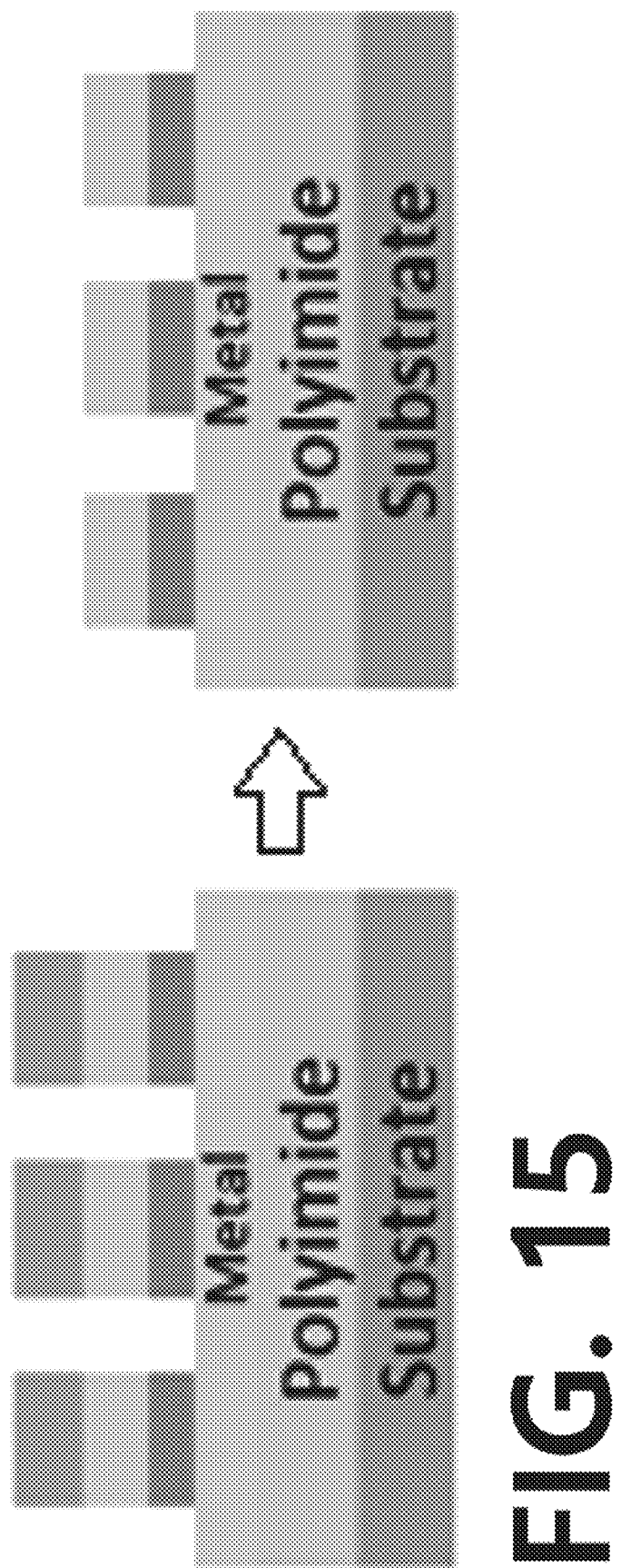

That is, referring to FIG. 15, step (3) is a step of removing a portion where the mask pattern layer is not formed so that the structure comprising the insulating layer and the metal layer sequentially stacked under the formed mask pattern layer forms a predetermined pattern. As the method of removing the portion where the mask pattern layer is not formed, any method commonly used in the art may be used without particular limitation as long as it does not damage the structure in which the insulating layer and the metal layer are sequentially stacked, and for example, wet etching, dry etching, or a combination thereof may be used.

Next, step (4) is a step of coating the protective coating layer having a predetermined thickness and covering the metasurface part to prevent the plurality of structures from falling off.

The protective coating layer may be coated with a mixed solution containing a polymer material, a curing agent, and a residual amount of a solvent, wherein the polymer material may be any known conventional material suitable for the present invention, and as a non-limiting example thereof, any one or more polymer materials selected from the group consisting of polyimide, polydimethylsiloxane (PDMS), and the like may be used.

The solvent may also be any known conventional material suitable for the present invention, and as a non-limiting example thereof, any one or more solvents selected from the group consisting of N-methylprrolidone (NMP) and N-dimethylacetamide (DMAc) may be used. In addition, the solvent is not particularly limited because any known conventional materials suitable for the purpose of the present invention may be used.

In this case, the polymer material and the solvent may be mixed in a weight ratio of 1:0.5 to 1:2.5, and more preferably in a weight ratio of 1:1 to 1:2.5. If the polymer material and the solvent are mixed in a ratio of more than 1:2.5, the concentration of the mixed solution may be thin, making it difficult to form the protective coating layer. If the polymer material and the solvent are mixed at a ratio of less than 1:0.5, the protective coating layer has sufficient protective power, but infrared selective emission performance may not be sufficiently implemented.

In addition, the coating method of the mixed solution is not particularly limited because any known conventional coating method may be used, and preferably, the coating may be performed at a speed of 2000 to 5000 rpm using spin coating.

Hereinafter, the present invention will be described in more detail by way of examples, but it should be understood that the following examples are not intended to limit the scope of the present invention, but to aid understanding of the present invention.

Example 1—Preparation of Infrared Selective Emitter (1:1)

(1) Step of Sequentially Forming a Conductive Thin Film Layer, an Insulating Layer, and a Metal Layer on a Substrate Diluted polyimide was spin-coated on a silicon wafer to fabricate a substrate of 13 μm. On the substrate, 200 nm of gold (Au) as a conductive thin film layer, 100 nm of $Si_3N_4$ as an insulating layer, and 200 nm of gold (Au) as a metal layer were sequentially deposited using E-beam evaporator, PECVD, and E-beam evaporator, respectively, to prepare a stacked structure.

(2) Step of Forming a Mask Pattern Layer Having a Predetermined Pattern on the Metal Layer A mask pattern layer having a circular meta-pattern having a diameter of 2 μm was formed on the stacked structure prepared in step (1).

(3) Step of Forming a Metasurface Part by Etching to the Insulating Layer Along the Mask Pattern Layer so that a Plurality of Structures Comprising the Insulating Layer and the Metal Layer Stacked on Each Other Form a Predetermined Pattern on the Conductive Thin Film Layer In the stacked structure manufactured in step (1), a portion where the mask pattern layer was not formed was etched using an inductively coupled plasma etching method to form a metasurface part in which a plurality of structures comprising the insulating layer and the metal layer stacked on each other were arranged to form a predetermined pattern.

(4) Step of Coating a Protective Coating Layer

The metasurface part obtained in step (3) was coated with a mixed solution, in which polyimide and a solvent were mixed in a ratio of 1:1, at a speed of 3000 rpm using a spin coating method, and then dried sufficiently to form a coating layer having a thickness of 350 nm.

Example 2—Preparation of Infrared Selective Emitter (1:1.5)

It was prepared as in Example 1, but in step (4), a mixed solution in which polyimide and a solvent were mixed in a ratio of 1:1.5 was coated, and then sufficiently dried to form a coating layer having a thickness of 250 nm.

Examples 3 to 7—Preparation of Infrared Selective Emitter (1:1.5)

They were prepared as in Example 1, but the diameters of the plurality of structures in which the insulating layer and the metal layer were stacked were varied from 1.1 to 1.5 μm, respectively.

Comparative Example 1—Preparation of Infrared Selective Emitter

It was prepared in the same manner as in Example 1 except that step (4) in Example 1 was not performed.

Comparative Examples 2 to 6—Preparation of
Infrared Selective Emitter

They were prepared as in Comparative Example 1, but the diameters of the plurality of structures in which the insulating layer and the metal layer were stacked were varied from 1.1 to 1.4 μm, respectively.

Experimental Example 1—Curvature Measurement
and Curved Surface Attachment Test

After the infrared selective emitters prepared in Examples 1 and 2 and Comparative Example 1 were attached to a copper wire having a radius of curvature of 250 μm, they were shown in FIG. 5 using a scanning electron microscope (SEM). Referring to FIG. 5, it was confirmed that in the case of Examples 1 and 2 according to the present invention, the metasurface part comprising the insulating layer and the metal layer on the conductive thin film layer was not lost in a bent state.

Experimental Example 2—SEM Image

The infrared selective emitters prepared in Examples 1 and 2 and Comparative Example 1 were observed using a scanning electron microscope (SEM), and were shown in FIGS. 6 and 7.

Experimental Example 3—Brush Test

For the infrared selective emitters prepared in Example 1, Example 2, and Comparative Example 1, a brush test is performed by repeating a process 30 or 50 times in which any 1.5 cm×1.5 cm area of the surface of the specimen is manually swept using a nylon brush, and the surface was observed and shown in FIGS. 8, 11A and 12A (brush (30) means that the test was performed 30 times).

Referring to FIGS. 8, 11A and 12A, in the case of Comparative Example 1 of FIG. 8(a) not including the protective coating layer 70, it can be seen even with the naked eye that many scratches occurred in the brush test according to the above experimental method. However, referring to FIG. 8(b) and FIG. 12A, in the case of Examples 1 and 2 including the protective coating layer 70 according to the present invention, it can be seen that relatively less surface damage occurred in the brush test according to the above experimental method. This difference occurs because the protective coating layer 70 can absorb physical and chemical stimuli from the outside to protect the protective coating layer 70.

Experimental Example 4—Emissivity Measurement

For Examples 1 and 2 and Comparative Example 1, the infrared emission band and emissivity were measured using Fourier transform infrared (FT-IR) equipment. Then, for Examples 1 and 2 and Comparative Example 1 tested in Experimental Example 3, the infrared emission band and emissivity were measured using Fourier transform infrared (FT-IR) equipment, and were shown in FIGS. 11B, 11C, 12A, and 12C.

Figure 19:
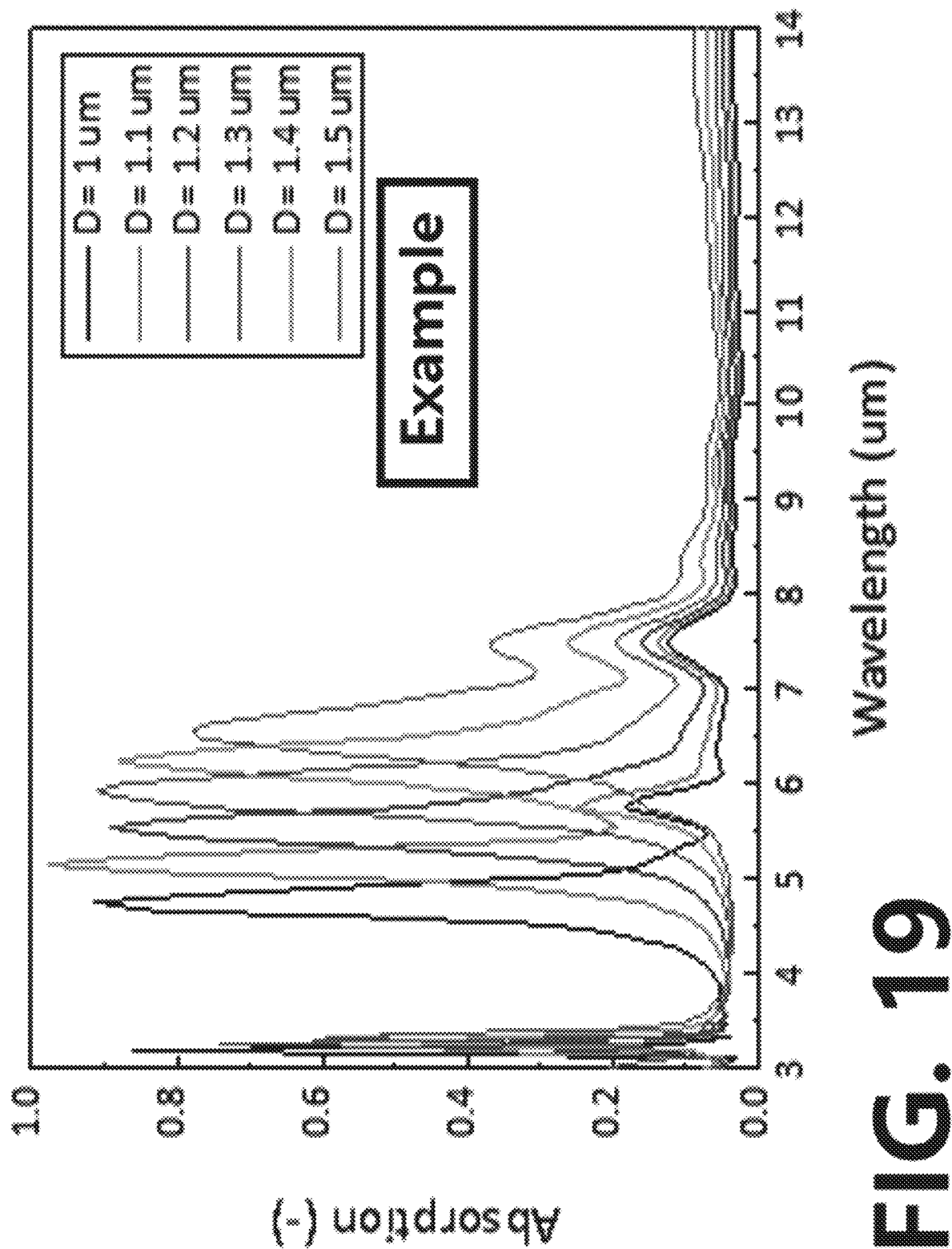
Figure 20:
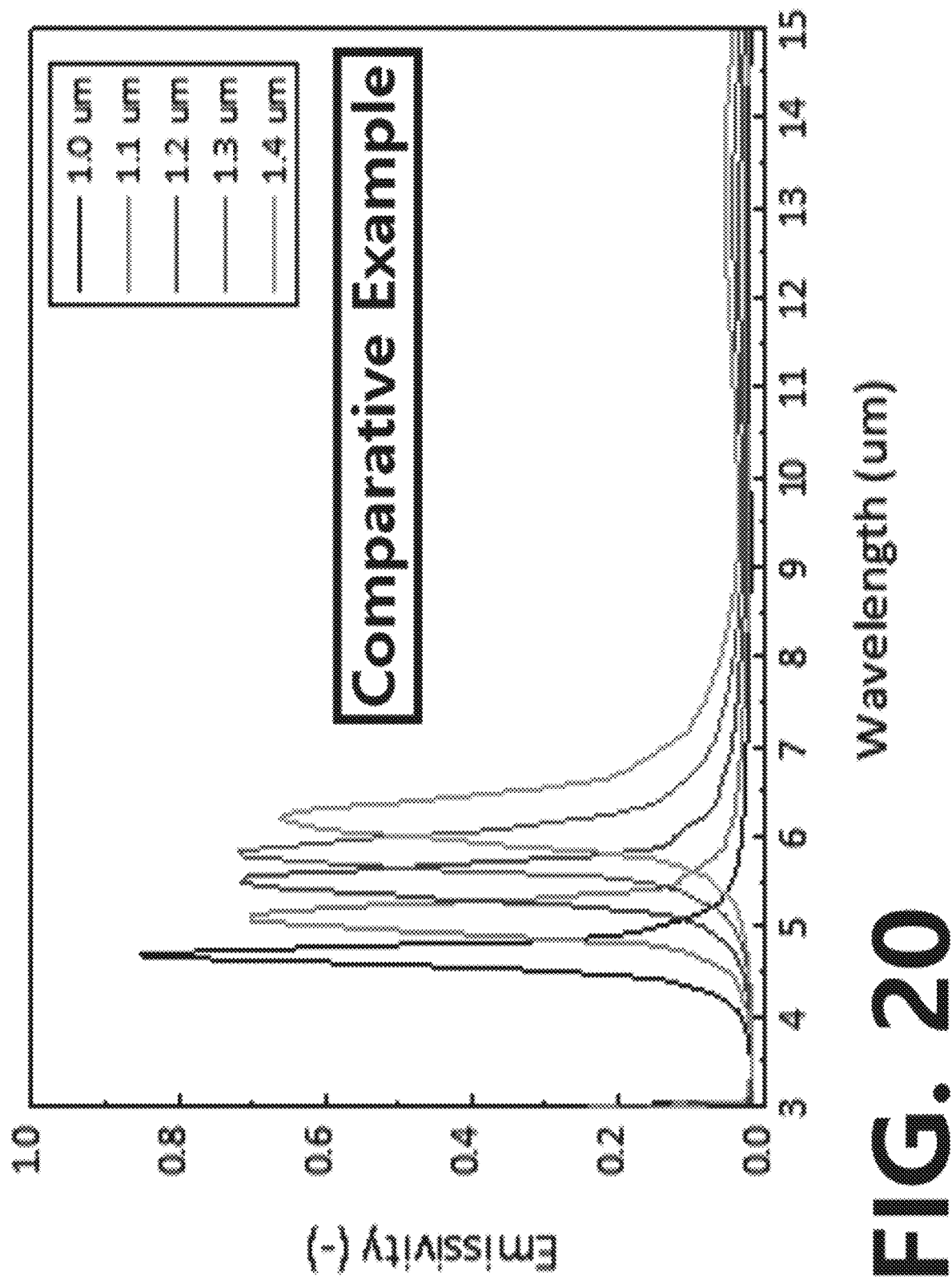

In addition, for Examples 3 to 7 and Comparative Examples 2 to 5, the emission band and emissivity were measured using the same equipment and shown in FIGS. 19 and 20.

Referring to FIGS. 11B and 11C, which are the results of Comparative Example 1, it can be seen that the emissivity in the infrared wavelength band of 5 to 8 μm is significantly reduced by up to 300% or more by external physical stimulation. In contrast, in the case of Examples 1 and 2 having the protective coating layer 70 according to the present invention, it can be seen that the infrared selective emitter exhibits remarkably broadband emission performance regardless of the number of repetitions of the brush.

In addition, referring to FIGS. 19 and 20, it can be seen that the peak shifts to a longer wavelength as the diameter of the structure increases, regardless of whether or not the coating is applied. However, in the case of the examples including the protective coating layer, it can be seen that the emissivity was measured to be higher, which is due to the broadband function in addition to the protection function of the protective coating layer.

The invention claimed is:
1. An infrared selective emitter including:
a substrate;
a conductive thin film layer disposed on the substrate;
a metasurface part in which a plurality of structures comprising an insulating layer and a metal layer stacked on each other are arranged in a predetermined pattern on the conductive thin film layer; and
a protective coating layer having a predetermined thickness and covering the metasurface part to prevent the plurality of structures from falling off, wherein the ratio (a/b) of the emissivity (b) at an infrared wavelength of 3 to 5 μm for the infrared selective emitter and the emissivity (a) at an infrared wavelength of 3 to 5 μm measured after a brush test according to the following experimental method is 0.9 or more and 1.0 or less, wherein:
the brush test is performed by repeating a process 30 to 50 times in which any 1.5 cm×1.5 cm area of the surface of the specimen is manually swept using a nylon brush, and an emissivity for the area is measured using Fourier transform infrared (FT-IR) equipment.
2. The infrared selective emitter according to claim 1, wherein the infrared selective emitter has a maximum emissivity of 0.8 or more in an infrared wavelength band of 5 to 8 μm.
3. The infrared selective emitter according to claim 2, wherein the protective coating layer protects the metasurface part and maximizes emissivity in an infrared wavelength band of 5 to 8 μm.
4. The infrared selective emitter according to claim 1, wherein the protective coating layer has a thickness of 150 to 500 nm.
5. The infrared selective emitter according to claim 1, wherein the insulating layer is any one selected from Silicon nitride ($Si_3N_4$), Silicon oxide ($SiO_2$) and Zinc sulfide (ZnS), and has a thickness of 30 to 300 nm.
6. The infrared selective emitter according to claim 1, wherein the conductive thin film layer is any one selected from gold (Au), silver (Ag), copper (Cu), aluminum (Al) and indium tin oxide (ITO), and has a thickness of 200 nm to 1 μm.
7. The infrared selective emitter according to claim 1, wherein the size of the structure is 1 to 3 μm, and
the thickness of the metal layer is 50 to 400 nm.
8. A method of manufacturing an infrared selective emitter, the method including the steps of:
(1) forming a conductive thin film layer, an insulating layer and a metal layer sequentially on a substrate;
(2) forming a mask pattern layer having a predetermined pattern on the metal layer;

(3) forming a metasurface part by etching to the insulating layer along the mask pattern layer so that a plurality of structures comprising the insulating layer and the metal layer stacked on each other form the predetermined pattern on the conductive thin film layer; and
(4) coating a protective coating layer having a predetermined thickness and covering the metasurface part to prevent the plurality of structures from falling off, wherein the ratio (a/b) of the emissivity (b) at an infrared wavelength of 3 to 5 μm for the infrared selective emitter and the emissivity (a) at an infrared wavelength of 3 to 5 μm measured after a brush test according to the following experimental method is 0.9 or more and 1.0 or less, wherein:

the brush test is performed by repeating a process 30 to 50 times in which any 1.5 cm×1.5 cm area of the surface of the specimen is manually swept using a nylon brush, and an emissivity for the area is measured using Fourier transform infrared (FT-IR) equipment.

9. The method of manufacturing an infrared selective emitter according to claim 8, wherein the protective coating layer is formed by coating a coating solution in which a polymer material and a solvent are mixed in a ratio of 1:0.5 to 1:2.5 at a speed of 2000 to 5000 rpm.

\* \* \* \* \*